United States Patent
Kohno et al.

(10) Patent No.: US 9,896,822 B2
(45) Date of Patent: Feb. 20, 2018

(54) HYBRID CONSTRUCTION MACHINE

(71) Applicant: HITACHI CONSTRUCTION MACHINERY CO., LTD., Tokyo (JP)

(72) Inventors: Ryuji Kohno, Tokyo (JP); Ken Takeuchi, Tsuchiura (JP); Shigeyuki Yoshihara, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/021,375

(22) PCT Filed: Jan. 19, 2015

(86) PCT No.: PCT/JP2015/051252
§ 371 (c)(1),
(2) Date: Mar. 11, 2016

(87) PCT Pub. No.: WO2015/115233
PCT Pub. Date: Aug. 6, 2015

(65) Prior Publication Data
US 2016/0222631 A1 Aug. 4, 2016

(30) Foreign Application Priority Data
Jan. 30, 2014 (JP) .................... 2014-016115

(51) Int. Cl.
*E02F 9/20* (2006.01)
*H01M 10/6554* (2014.01)
(Continued)

(52) U.S. Cl.
CPC ............. *E02F 9/2091* (2013.01); *B60K 1/04* (2013.01); *B60K 6/28* (2013.01); *B60K 6/485* (2013.01);
(Continued)

(58) Field of Classification Search
CPC ...... B60L 11/02; B60L 11/18; B60L 11/1874; B60L 11/1875; B60L 11/1877; B60K 2001/0405; H01M 10/625
See application file for complete search history.

(56) References Cited

U.S. PATENT DOCUMENTS 3,110,633 A * 11/1963 Bachmann .......... H01M 10/625
123/142.5 E
5,378,555 A * 1/1995 Waters ................ H01M 2/1083
180/68.5
(Continued)

FOREIGN PATENT DOCUMENTS

JP 08-284660 A 10/1996
JP 2001-223035 A 8/2001
(Continued)

OTHER PUBLICATIONS

International Search Report of PCT/JP2015/051252 dated Apr. 7, 2015.

*Primary Examiner* — Frank B Vanaman
(74) *Attorney, Agent, or Firm* — Mattingly & Malur, PC

(57) ABSTRACT

A hybrid construction machine which can improve temperature control efficiency of an electrical storage device. It includes an engine 1, an assisting electricity generation motor 2 which performs assistance of power for the engine 1 and electricity generation and an electrical storage device 8 which performs transfer of electric power with this assisting electricity generation motor 2. The electrical storage device 8 includes a plurality of battery cells 200, a housing 220 which covers the plurality of battery cells 200 in a state of leaving them separated, a cooling plate 203 which is attached to this housing 220 and performs heat exchange with the plurality of battery cells 200, and a projection 214
(Continued)

which is interposed between the housing 220 and the cooling plate 203 and hinders heat transfer between the housing 220 and the cooling plate 203.

5 Claims, 13 Drawing Sheets

(51) Int. Cl.
| | |
|---|---|
| B60L 11/18 | (2006.01) |
| B60K 1/04 | (2006.01) |
| B60K 6/28 | (2007.10) |
| B60K 6/485 | (2007.10) |
| H01M 10/625 | (2014.01) |
| H01M 10/647 | (2014.01) |
| H01M 10/6556 | (2014.01) |
| H01M 10/6567 | (2014.01) |
| H01M 10/613 | (2014.01) |
| H01M 10/658 | (2014.01) |
| E02F 9/08 | (2006.01) |
| E02F 3/32 | (2006.01) |
| B60L 1/00 | (2006.01) |
| H01M 2/10 | (2006.01) |
| H01M 10/615 | (2014.01) |
| B60K 1/00 | (2006.01) |

(52) U.S. Cl.
CPC .......... *B60L 1/003* (2013.01); *B60L 11/1874* (2013.01); *B60L 11/1879* (2013.01); *E02F 3/32* (2013.01); *E02F 9/0858* (2013.01); *E02F 9/0866* (2013.01); *E02F 9/2075* (2013.01); *H01M 2/1077* (2013.01); *H01M 10/613* (2015.04); *H01M 10/615* (2015.04); *H01M 10/625* (2015.04); *H01M 10/647* (2015.04); *H01M 10/658* (2015.04); *H01M 10/6554* (2015.04); *H01M 10/6556* (2015.04); *H01M 10/6567* (2015.04); *B60K 2001/005* (2013.01); *B60L 2200/40* (2013.01); *B60Y 2200/412* (2013.01); *H01M 2220/20* (2013.01); *Y02T 10/6226* (2013.01); *Y02T 10/7005* (2013.01); *Y02T 10/705* (2013.01); *Y10S 903/903* (2013.01)

(56) References Cited

U.S. PATENT DOCUMENTS

| | | | | |
|---|---|---|---|---|
| 5,713,426 | A | * | 2/1998 | Okamura ................ B60K 1/04 180/65.245 |
| 5,781,403 | A | * | 7/1998 | Aoki ..................... H01G 9/155 361/502 |
| 2002/0102454 | A1 | * | 8/2002 | Zhou ................... H01M 2/1083 429/88 |
| 2003/0095382 | A1 | * | 5/2003 | Takedomi ................ B60K 1/04 361/688 |
| 2007/0187180 | A1 | * | 8/2007 | Kagoshima .............. B60K 6/12 182/232 |
| 2015/0037633 | A1 | * | 2/2015 | Akiyama ............ H01M 2/1077 429/83 |
| 2015/0135940 | A1 | * | 5/2015 | Rawlinson .............. F41H 7/042 89/36.08 |

FOREIGN PATENT DOCUMENTS

| | | |
|---|---|---|
| JP | 2012-021396 A | 2/2012 |
| JP | 2013-125617 A | 6/2013 |
| WO | 2004/025807 A1 | 3/2004 |
| WO | 2012/118015 A1 | 9/2012 |

\* cited by examiner

HYBRID CONSTRUCTION MACHINE

TECHNICAL FIELD

The present invention relates to a hybrid construction machine hybrid construction machine provided with an electrical storage device which supplies electric power to prime movers such as a motor and an inverter and so forth.

BACKGROUND ART

In general, a construction machine such an a hydraulic excavator and so forth to be driven by an hydraulic system is provided with a hydraulic pump which makes maximum load work possible, and a large-sized engine which drives this hydraulic pump so as to cope with all kinds of work from light load work to heavy load work. In particular, in the hydraulic excavator, the maximum load is generated when the work such as excavation, loading and so forth of sediment is performed.

The heavy load work on which such a maximum load is imposed is part of the overall work and the capacity of the engine is left over at the time of the light load work such as horizontal tow and so forth for levelling the ground. This is one of factors which make a reduction in fuel consumption amount (hereinafter, abbreviated as fuel efficiency as the case may be) of the hydraulic excavator difficult. In view of this point, there is known the hybrid construction machine that the engine is miniaturized in order to reduce the fuel efficiency and an output shortage in association with miniaturization of the engine is supported (assisted) with an output by a prime mover and an electrical storage device on which secondary batteries, capacitors and so forth (hereinafter, referred to as batteries) are loaded is used as a power source of the prime mover.

Electric equipment such as the electrical storage device, the prime mover and so forth which configure this hybrid construction machine requires appropriate temperature control for thermal protection and a highly efficient operation of a drive circuit. In particular, in the electrical storage device, when the battery is at an excessively low temperature, internal resistance of the battery is increased, input/output characteristics are remarkably lowered and a reduction in operating capability of the construction machine is brought about. On the other hand, when the battery is at an excessively high temperature, since such deterioration of the battery that the battery capacity is irreversibly lowered or the internal resistance is increased and so forth is promoted, the useful life of the electrical storage device is shortened. Accordingly, it is required for the electrical storage device to be provided with battery cooling and warming-up functions according to the situation.

Conventionally, as the battery cooling and warming-up functions of the electrical storage device, a method of forcibly applying outdoor air (air) which is a heating medium to a battery surface by a fan, a blower and so forth, a method of forcibly introducing a liquid (a coolant) which is the heating element to the battery surface by a pump and so forth and so forth are used. The former method is an air-cooled type and the later method is called a water-cooled type or liquid-cooled type and so forth. In the application to the hybrid construction machine, since it is necessary to protect the heating medium and a passage thereof against dust and many contrivances and improvements are needed when the air-cooled type in which the passage of the heating medium is made as an open system is adopted, the liquid-cooled type in which the passage of the heating medium is made as a closed system is often adopted.

As one of conventional technologies for such a liquid-cooled type electrical storage device, there is known an electrical storage device that a battery block an outer casing can of which is made of a metal and which is made by laminating a plurality of battery cells is fixed onto a cooling plate in which the passage through which a refrigerant is circulated has been formed via a heat transfer member, the battery block and the cooling plate are thermally coupled together and thereby the respective battery cells in the battery block can be cooled in a uniform state (see, for example, Patent Literature 1).

On the other hand, in a case where the conventional electrical storage device disclosed in this Patent Literature 1 has been applied to the hybrid construction machine as it is, since it is feared that each battery cell in the battery block may be directly exposed to the outdoor air, dust, moisture and so forth in a work atmosphere of the hybrid construction machine may be adhered to the battery block of the electrical storage device and thereby a normal operation of the battery and the reliability thereof may be hindered, it is necessary to protect the electrical storage device against these dust, moisture and so forth.

Accordingly, there is proposed a hybrid hydraulic excavator which includes a plurality of capacitor cells for each containing a plurality of capacitors, a cooling plate for cooling each capacitor cell, a top cover for covering the plurality of capacitor cells in a lump and a bottom cover for covering a region where the capacitor cells are attached on the bottom side of the cooling plate, in which the cooling plate has a cover attachment hole which is bored in a thickness direction and into which a screw member for attaching these top cover and bottom cover is inserted, the top cover and the bottom cover which have been fixed to the cooling plate with this screw member cover the capacitor cells and thereby a drip-proof effect and a dust-proof effect for the capacitors can be obtained (see, for example, Patent Literature 2).

CITATION LIST

Patent Literature

Patent Literature 1: WO 2012-118015
Patent Literature 2: Japanese Patent Application Laid-Open No. 2012-21396

SUMMARY OF INVENTION

Technical Problem

The conventional hybrid hydraulic excavator disclosed in the above-mentioned Patent Literature 2 is liable to induce heat migration among the top cover, the bottom cover and the cooling plate because the top cover and the bottom cover are directly connected to the cooling plate and these top cover, bottom cover and cooling plates are in a thermally coupled state. Accordingly, it becomes a problem that the temperature control efficiency of the electrical storage device is lowered because heat of the capacitor escapes to the top cover and the bottom cover through the cooling plate. In particular, in a case where the heat capacity is made large in accordance with the thicknesses of the top cover and the bottom cover or where the above-mentioned hybrid hydraulic excavator has been placed under a gale environment, heat migration among the top cover, the bottom cover and the cooling plate becomes remarkable and therefore it is feared that time may be taken when warming up the electrical storage device so as to heighten the temperature of the capacitor at the time of starting and so forth in winter.

The present invention has been made under such circumstances of the conventional technologies and an object thereof is to provide a hybrid construction machine which can improve the temperature control efficiency of the electrical storage device.

Solution to Problem

In order to attain the above-mentioned object, a hybrid construction machine according to the present invention includes a prime mover, a motor generator which performs assistance of power for this prime mover and electricity generation and an electrical storage device which performs transfer of electric power with this motor generator, in which the aforementioned electrical storage device includes a plurality of battery cells, a housing which covers the aforementioned plurality of battery cells in a state of leaving them at least partially separated from one another, a heat exchange member which is attached to this housing and performs heat exchange with the aforementioned plurality of battery cells, and a thermal resistor which is interposed between the aforementioned housing and the aforementioned heat exchange member and hinders transfer of heat between the aforementioned housing and the aforementioned heat exchange member.

The present invention so configured can suppress escape of heat of each battery cell to the housing because heat migration between the housing and the heat exchange member is avoided by the thermal resistor by interposing the thermal resistor between the housing and the heat exchange member. Thereby, the temperature control efficiency of the electrical storage device can be improved.

In addition, the hybrid construction machine according to the present invention is featured such that in the aforementioned invention, the aforementioned heat exchange member consists of a structure which forms a passage of a heating medium therein and the aforementioned thermal resistor is in contact with part of the aforementioned structure. When it is configured in this way, a contact area between the housing and the heat exchange member can be reduced by the thermal resistor and therefore heat resistance between the housing and the heat exchange member can be heightened. Thereby, heat transmission between the housing and the heat exchange member can be easily blocked.

In addition, the hybrid construction machine according to the present invention is featured such that in the aforementioned invention, the aforementioned structure consists of a polyhedron and the aforementioned plurality of battery cells are respectively provided on different faces of the aforementioned polyhedron. When it is configured in this way, the plurality of battery cells can be heat-exchanged simultaneously by one heat exchange member by respectively bringing the plurality of battery cells into contact with different faces of the heat exchange member and therefore the time required for heat exchange of the plurality of battery cells can be shortened. Thereby, the efficiency of heat exchange by the heat exchange member can be heightened.

In addition, the hybrid construction machine according to the present invention is featured such that in the aforementioned invention, the aforementioned thermal resistor is made of a resin material having a thermal conductivity which is smaller than at least one of a thermal conductivity of the aforementioned housing and a thermal conductivity of the aforementioned heat exchange member. When it is configured in this way, the thermal resistor can be easily processed modeling after the shape of a part to be interposed between the housing and the heat exchange member and therefore a degree of freedom for arrangement of the housing and the heat exchange member can be heightened.

In addition, the hybrid construction machine according to the present invention is featured such that in the aforementioned invention, at least one of the aforementioned housing and the aforementioned heat exchange member is made of a metal material. When it is configured in this way, since the thermal conductivity of the resin material used in the thermal resistor is comparatively small relative to the thermal conductivity of the metal material, selection of the resin material which is suited as the thermal resistor between the housing and the heat exchange member can be promptly performed.

In addition, the hybrid construction machine according to the present invention is featured such that in the aforementioned invention, the aforementioned housing has a volume body which is opened downward and is fixed to the aforementioned heat exchange member from above the aforementioned plurality of battery cells through an opening in the aforementioned volume body in a state of leaving the aforementioned plurality of battery cells arranged above the aforementioned heat exchange member. When it is configured in this way, a space around the plurality of battery cells is opened in a state of not attaching the housing to the heat exchange member in an assembling process of the electrical storage device and therefore connection and so forth of wiring of these battery cells can be easily performed. Thereby, the efficiency of arrangement work of the electrical storage device can be improved.

In addition, the hybrid construction machine according to the present invention is featured such that, in the aforementioned invention, said electrical storage device includes a plurality of battery modules configured by connecting the aforementioned plurality of battery cells together, the aforementioned heat exchange member consists of a plurality of cooling plates which are respectively arranged under the aforementioned plurality of battery modules and cool the aforementioned plurality of battery cells, the aforementioned thermal resistor consists of a plurality of thermal resistance materials which are respectively arranged under the aforementioned plurality of battery nodules and hinder transfer of heat between the aforementioned housing and the aforementioned cooling plates and sizes in a horizontal direction of the aforementioned each cooling plate and aforementioned each heat resistance material are set comparable to and not more than sizes in the horizontal direction of the aforementioned plurality of battery modules.

The present invention so configured can reduce a loading interval of the adjacent battery modules because each cooling plate and each thermal resistance material are compactly put under each battery module and each cooling plate and each thermal resistance material almost never project to the outside of each battery module. Thereby, the electrical storage device can be miniaturized.

In addition, the hybrid construction machine according to the present invention is featured such that in the aforementioned invention, the aforementioned housing consists of a metal casting. When it is configured in this way, airtightness of the electrical storage device is ensured and the strength which is sufficient against vibrations and shocks can be obtained.

In addition, the hybrid construction machine according to the present invention includes a prime mover compartment which contains the aforementioned prime mover and a radiator which is arranged in this prime mover compartment and cools the aforementioned heating medium, in which the aforementioned prime mover compartment has a suction port which is formed in a frame and through which outdoor air which is sent to the aforementioned radiator is taken in and aforementioned electrical storage device is arranged between the aforementioned frame of the aforementioned prime mover compartment and the aforementioned radiator. When it is configured in this way, the outdoor air which has been taken into the prime mover compartment blows against the radiator and the electrical storage device and therefore the housing of the electrical storage device can be cooled with the outdoor air. Thereby, since excessive rising of the temperature of the electrical storage device can be suppressed, the electrical storage device can be maintained in a proper state and high reliability can be obtained.

Advantageous Effects of Invention

According to the hybrid construction machine of the present invention, the temperature control efficiency of the electrical storage device can be improved. Subject matters, configurations and advantageous effects other than the above will be apparent from the following description on the embodiments.

DESCRIPTION OF EMBODIMENTS

In the following, modes for carrying out a hybrid construction machine according to the present invention will be described on the basis of the drawings.

First Embodiment

Figure 1:
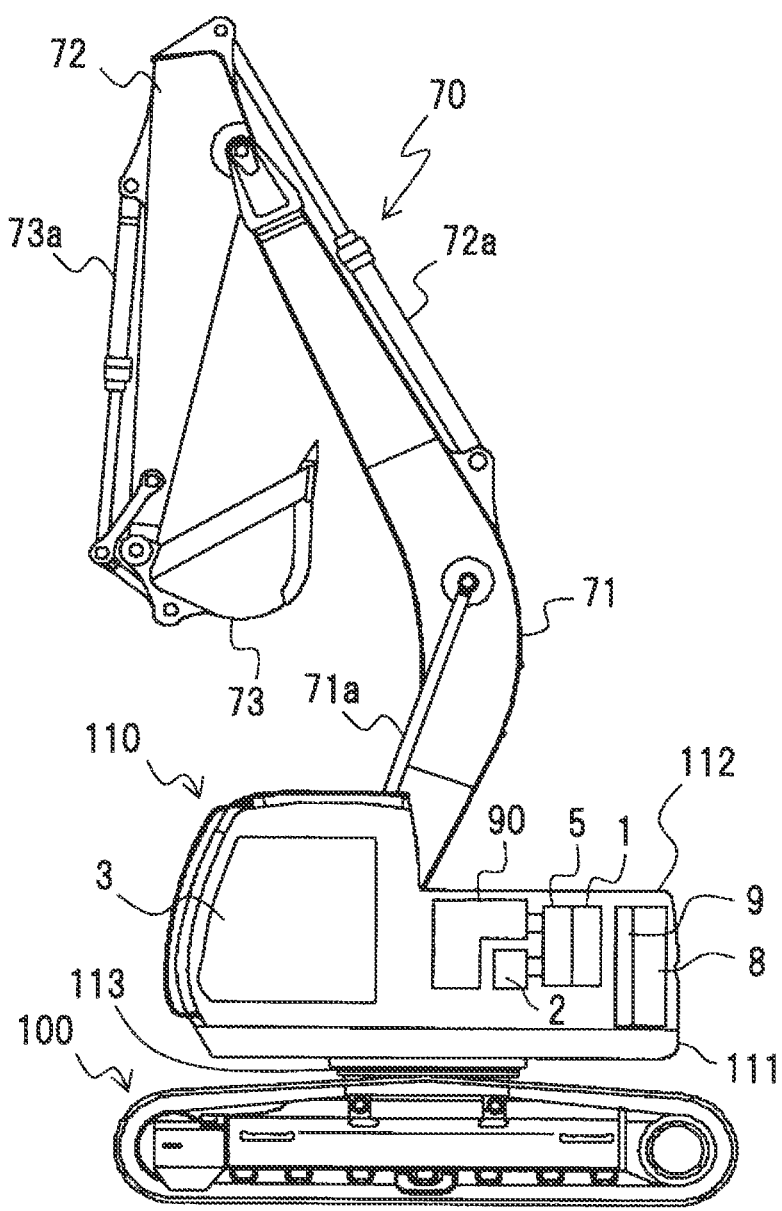
FIG. 1 is a diagram showing a configuration of a hybrid hydraulic excavator which has been given as a first embodiment of a hybrid construction machine according to the present invention.
Figure 2:
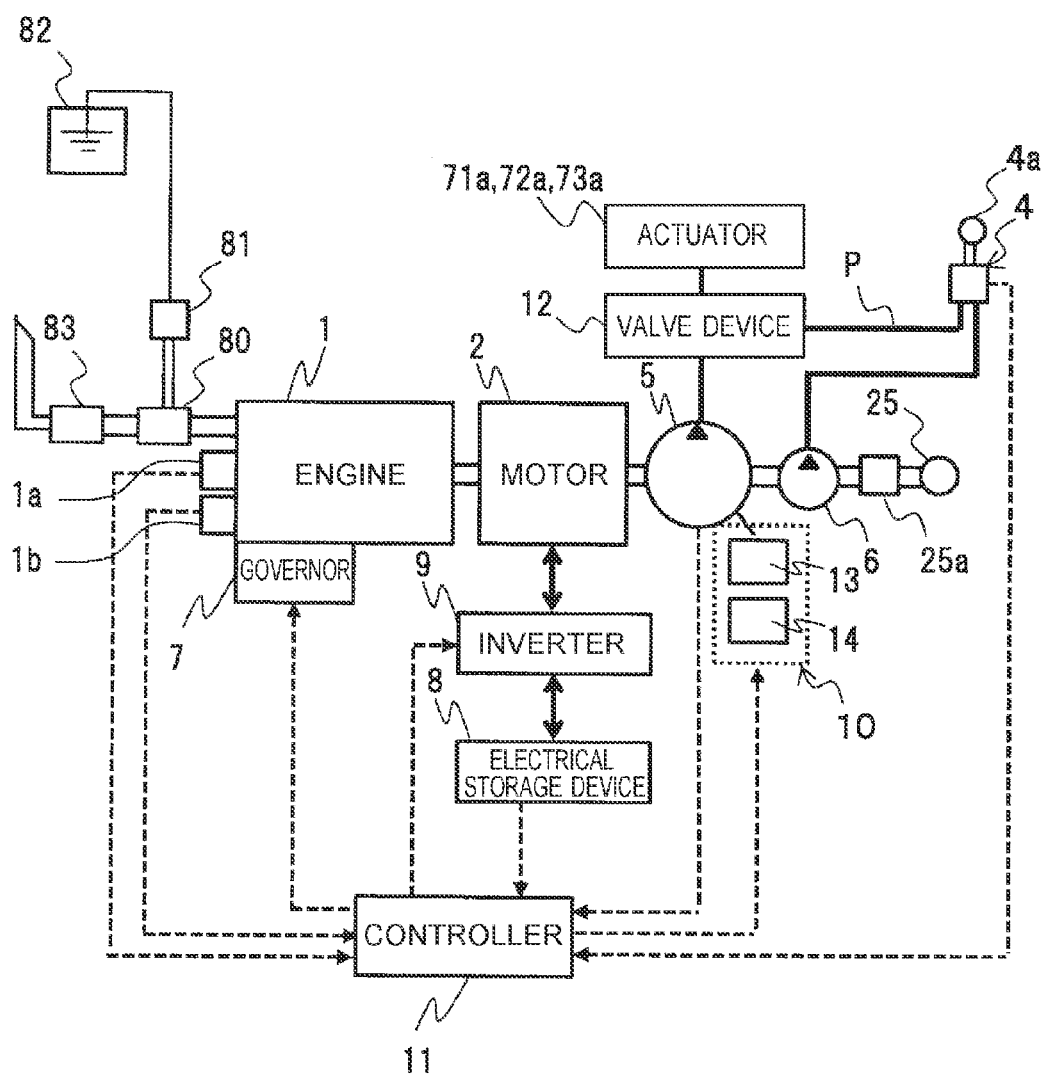
FIG. 2 is a diagram explaining a configuration of essential parts of the hybrid hydraulic excavator according to the first embodiment of the present invention.
Figure 3:
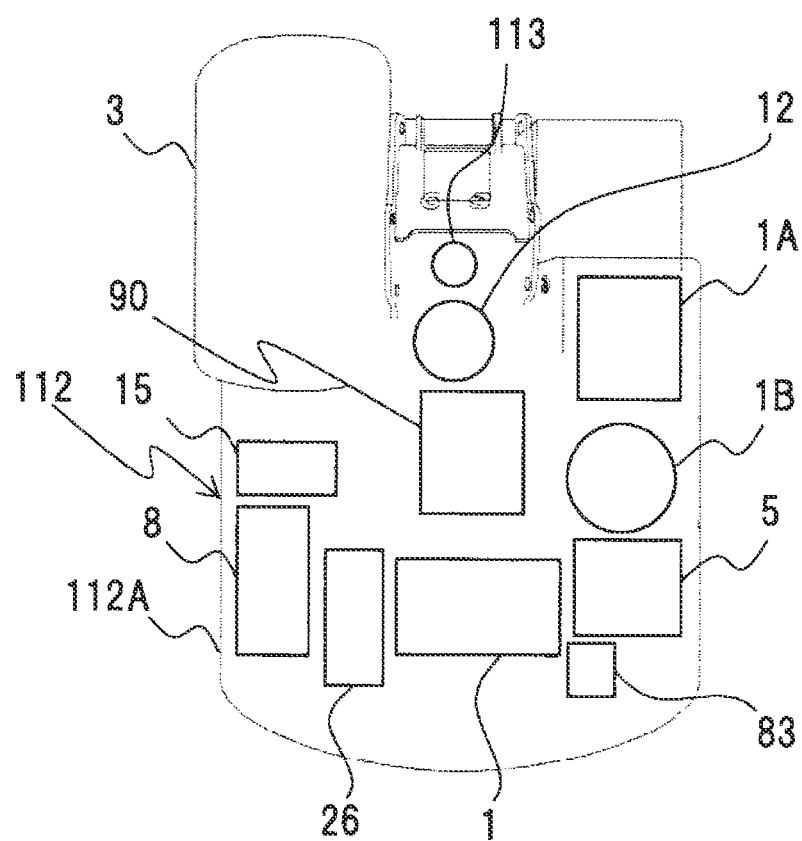
FIG. 3 is a diagram explaining an internal configuration of a prime mover compartment of the hybrid hydraulic excavator according to the first embodiment of the present invention.

FIG. 1 is a diagram showing a configuration of a hybrid hydraulic excavator which has been given as one embodiment of a hybrid construction machine according to the present invention. FIG. 2 is a diagram explaining a configuration of essential parts of the hybrid hydraulic excavator according to a first embodiment of the present invention. FIG. 3 is a diagram explaining an internal configuration of a prime mover compartment of the hybrid hydraulic excavator according to the first embodiment of the present invention.

The first embodiment of the hybrid construction machine according to the present invention is applied to the hybrid hydraulic excavator (hereinafter, called a hydraulic excavator conveniently), for example, as shown in FIG. 1. This hydraulic excavator is provided with a travel base 100, a revolving superstructure 110 which has been provided on this travel base 100 via a revolving frame 111 so as to freely revolve, a revolving device 113 which is interposed between this travel base 100 and revolving superstructure 110 to revolve the revolving superstructure 110, and a front working mechanism 70 which is attached to the front of the revolving superstructure 110 and rotationally moves in an up-down direction to perform work such as excavation and so forth.

The front working mechanism 70 has a boom 71 which is attached to the revolving frame 111 at a base end so as to be rotationally movable and rotationally moves in the up-down direction, an arm 72 which is attached to a leading end of this boom 71 so as to be rotationally movable and a bucket 73 which is attached to a leading end of this arm 72 so as to be rotationally movable. In addition, the front working mechanism 70 has a boom cylinder 71a which connects together the revolving superstructure 110 and the boom 71 and expands and contracts to rotationally move the boom 71, an arm cylinder 72a which connects together the boom 71 and the arm 72 and expands and contracts so as to rotationally move the arm 72, and a bucket cylinder 73a which connects together the arm 72 and the bucket 73 and expands and contracts so as to rotationally move the bucket 73.

The revolving superstructure 110 is provided with a cab (a cabin) 3 which has been provided on the front on the revolving frame 111 as shown in FIG. 1 to FIG. 3, a prime mover compartment 112 which has been provided on the rear on the revolving frame 111 and in which a suction port (not shown) for taking in the outdoor air is formed, an air cleaner 15 which cleans the outdoor air which has flown in through the suction port in this prime mover compartment 112, an engine 1 as a prime mover which has been contained in the prime mover compartment 112, and a governor 7 which adjusts a fuel injection quantity of this engine 1.

In addition, the revolving superstructure 110 is provided with a fuel tank 1A which stores fuel of the engine 1, a fuel filter 1B which filters the fuel to be supplied from this fuel tank 1A to the engine 1, a rotational speed sensor 1a which detects an actual rotational speed of the engine 1, an engine torque sensor 1b which detects a torque of the engine 1, and an assisting electricity generation motor 2 as a motor generator which performs assisting of the power of the engine 1 and electricity generation. This assisting electricity generation motor 2 is arranged on a drive shaft of the engine 1 and performs torque transmission with the engine 1. Incidentally, a compressor 25 is connected to the drive shaft of the engine 1 via a clutch 25a.

Further, the revolving superstructure 110 is provided with an inverter device 9 which controls a rotational speed of the assisting electricity generation motor 2, a liquid-cooled type electrical storage device 8 which performs electric power transfer with the assisting electricity generation motor 2 via this inverter device 9, and a valve device 12 which controls a flow rate and a direction of pressurized oil to be supplied to hydraulic actuators 71a to 73a such as the above-mentioned boom cylinder 71a, arm cylinder 72, and bucket cylinder 73a and so forth.

In the prime mover compartment 112 of the revolving superstructure 110, a hydraulic system 90 for driving the hydraulic actuators 71a to 73a is arranged. This hydraulic system 90 includes a hydraulic pump 5 which serves as an oil pressure source for generating an oil pressure, a pilot hydraulic pump 6 which generates a pilot pressurized oil, and an operation device 4 which is connected to an operation unit of the valve device 12 via a pilot pipeline P to enable desired operations of the respective hydraulic actuators 71a to 73a. This operation device 4 is provided in the cab 3 and has an operating lever 4a that an operator grips and operates.

Further, the revolving superstructure 110 is provided with a pump displacement regulation device 10 which adjusts a displacement of the hydraulic pump 5, and a controller 11 which adjusts the governor 7 to control the rotational speed of the engine 1 and controls the inverter device 9 to control the torque of the assisting electricity generation motor 2. Incidentally, a hydraulic circuit is configured by the hydraulic pump 5, the hydraulic actuators 71a to 73a and the valve device 12, and the actual rotational speed of the engine 1 which is detected by the above-mentioned rotational speed sensor 1a, the torque of the engine 1 which is detected by the engine torque sensor 1b, an operation amount of the operating lever 4a and so forth are input into the controller 11.

Then, the hydraulic pump 5 is connected to the engine 1 via the assisting electricity generation motor 2, the hydraulic pump 5 and the pilot hydraulic pump 6 are operated with driving forces of the engine 1 and the assisting electricity generation motor 2, and thereby the pressurized oil which has been discharged from the hydraulic pump 5 is supplied to the valve device 12 and the pilot pressurized oil which has been discharged from the pilot hydraulic pump 6 is supplied to the operation device 4.

At this time, when the operator in the cab 3 operates the operating lever 4a, the operation device 4 supplies the pilot pressurized oil according to the operation amount of the operating lever 4a to the operation unit of the valve device 12 via the pilot pipeline P, and thereby the position of a spool in the valve device 12 is switched with the pilot pressurized oil and the pressurized oil which has passed through the valve device 12 is supplied from the hydraulic pump 5 to the hydraulic actuators 71a to 73a. Thereby, the hydraulic actuators 71a to 73a drive with the pressurized oil which has been supplied from the hydraulic pump 5 via the valve device 12.

The hydraulic pump 5 has, for example, a swash plate (not shown) as a variable displacement mechanism and controls a discharge flow rate of the pressurized oil by adjusting a tilting angle of this swash plate. Although, in the following, the hydraulic pump 5 will be described as a swash plate pump, if it has a function of controlling the discharge flow rate of the pressurized oil, the hydraulic pump 5 may be an inclined shaft pump and so forth. Incidentally, though not shown in the drawing, a discharge pressure sensor which detects a discharge pressure of the hydraulic pump 5, a discharge flow rate sensor which detects the discharge flow rate of the hydraulic pump 5 and an inclination angle sensor which measures the tilting angle of the swash plate are provided on the hydraulic pump 5 and the controller 11 works to input the discharge pressure, the discharge flow rate of the hydraulic pump 5 and the tilting angle of the swash plate obtained from the respective sensors and to arithmetically calculate a load on the hydraulic pump 5.

The pump displacement regulation device 10 is adapted to regulate the displacement (a displacement volume) of the hydraulic pump 5 on the basis of an operation signal which is output from the controller 11. Specifically, the pump displacement regulation device 10 has a regulator 13 which supports the swash plate so as to freely tilt, and an electromagnetic proportional valve 14 which applies a control pressure to the regulator 13 in accordance with a command value of the controller 11, and when the control pressure is received from the electromagnetic proportional value 14, the regulator 13 changes the tilting angle of the swash plate by this control pressure and thereby the displacement (the displacement volume) of the hydraulic pump 5 is regulated and an absorption torque (an input torque) of the hydraulic pump 5 can be controlled.

In addition, an exhaust gas cleaning system which cleans exhaust gas exhausted from the engine 1 is provided in an exhaust passage of the engine 1, and this exhaust gas cleaning system is provided with a selective contact reduction catalyst (SCR catalyst) 80 which promotes a reduction reaction of a nitrogen oxide in the exhaust gas with ammonium which is generated from urea as a reducer, a reducer adding device 81 which adds urea into the exhaust passage of the engine 1, an urea tank 82 which stores urea to be supplied to this reducer adding device 81, and a muffler (a silencer) 83 which muffles exhaust sound of the engine 1. Accordingly, the exhaust gas of the engine 1 is radiated to the atmosphere via the muffler 83 after nitrogen oxide in the exhaust gas has been cleaned to harmless water and nitrogen with the selective contact reduction catalyst 80.

Since the above-mentioned assisting electricity generation motor 2, inverter device 9 and electrical storage device 8 generate heat by being used, the revolving superstructure 110 is provided with a later described cooling circuit 21 (see FIG. 4) for cooling the assisting electricity generation motor 2, the inverter device 9 and the electrical storage device 8 in order to suppress temperature rising of these pieces of equipment. Here, since there is an upper limit temperature that it can be used with no electric current limit for the electrical storage device 8, a temperature control device 20 (see FIG. 4) which controls the temperature of the electrical storage device 8 is loaded on the revolving superstructure 110 such that the temperature of the electrical storage device 8 does not become excessively high.

Figure 4:
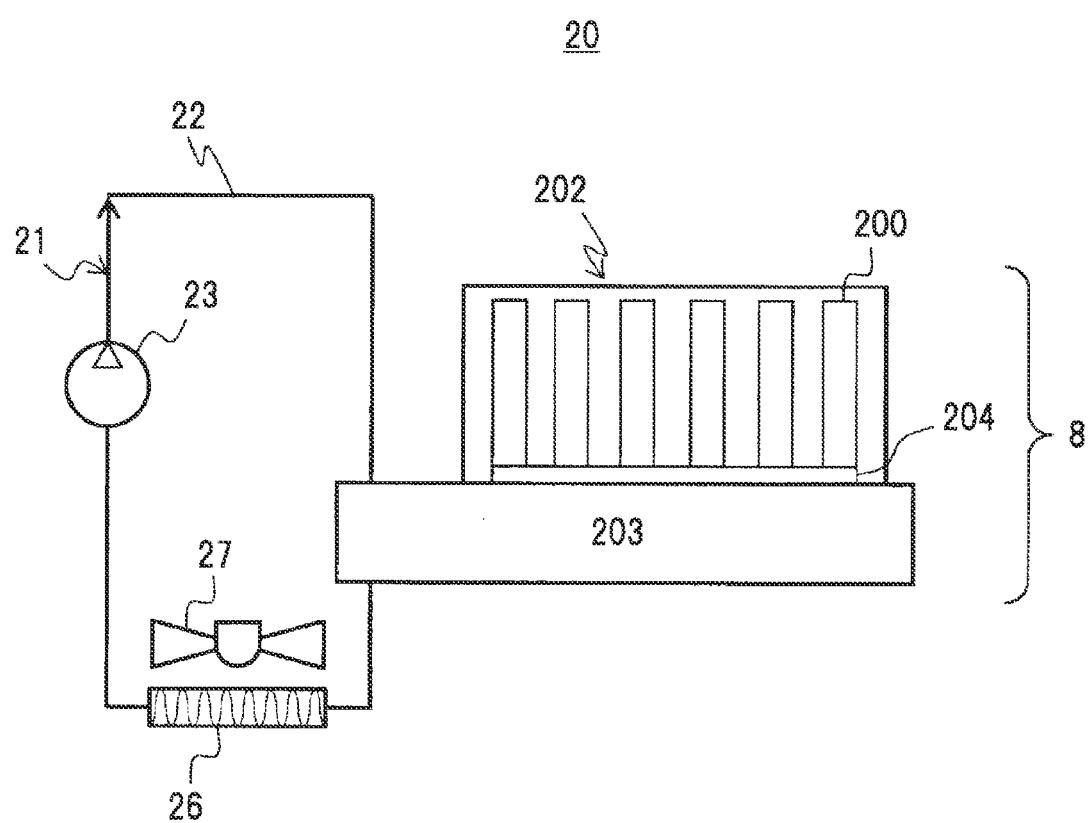
FIG. 4 is a diagram showing a configuration of a temperature control device according to the first embodiment of the present invention.
Figure 5:
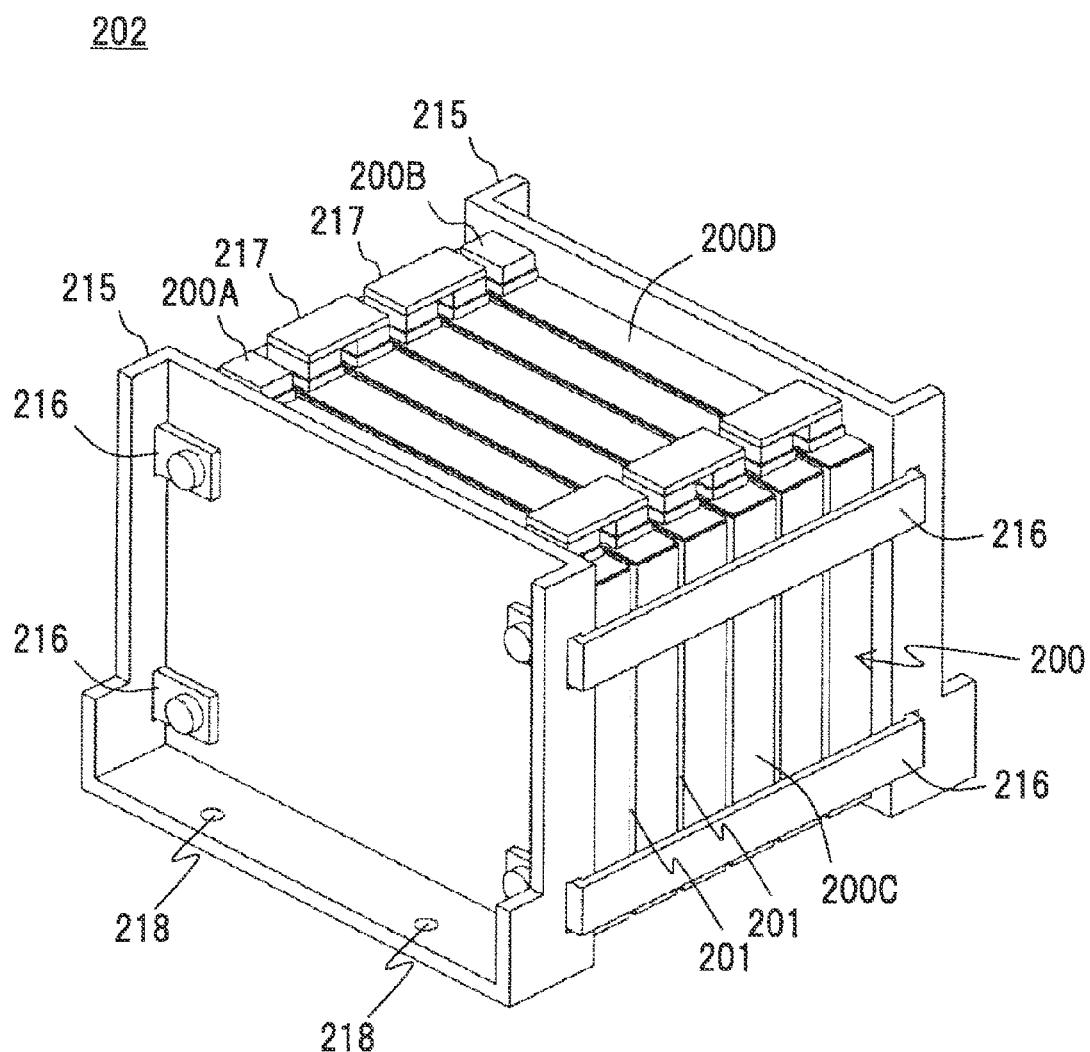
FIG. 5 is a perspective view showing a configuration of a battery module according to the first embodiment of the present invention.
Figure 6:
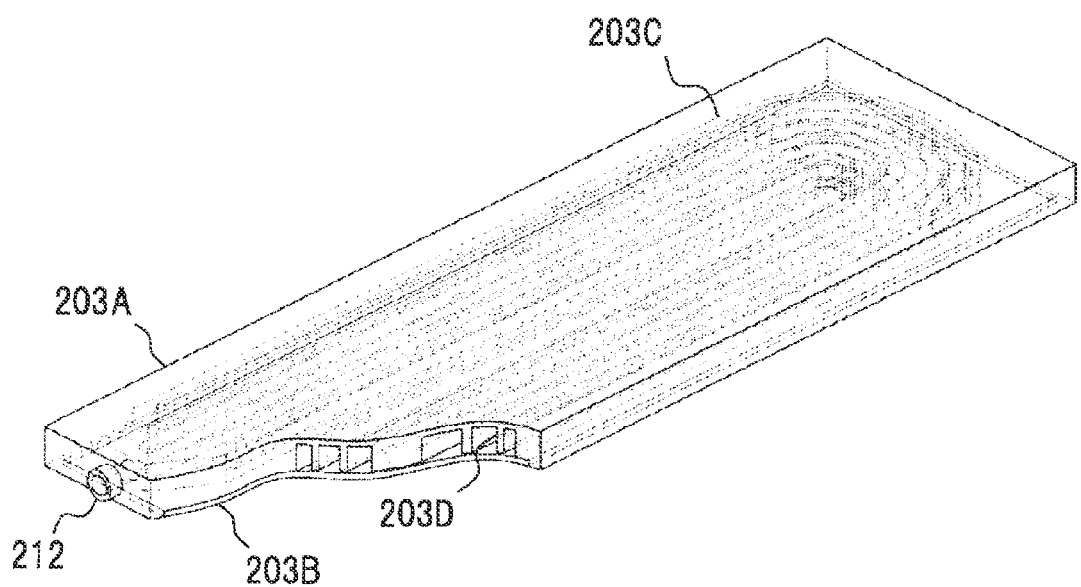
FIG. 6 is a diagram explaining a configuration of a cooling plate according to the first embodiment of the present invention.

FIG. 4 is a diagram showing a configuration of the temperature control device according to the first embodiment of the present invention, FIG. 5 is a perspective view showing a configuration of a battery module according to the first embodiment of the present invention, and FIG. 6 is a diagram explaining a configuration of a cooling plate according to the first embodiment of the present invention.

As shown in FIG. 4, the temperature control device 20 includes the above-mentioned cooling circuit 21 which cools the electrical storage device 8 by circulating a coolant (an anti-freezing solution) as a heating medium, this cooling circuit 21 is configured by liquid piping 22 in which the coolant passes, a pump 23 which circulates the coolant in this liquid piping 22, a radiator 26 which cools the coolant which has been supplied to a later described cooling plate 203 of the electrical storage device 8 by this pump 23, and a fan 27 which is attached to this radiator 26 and sends the outdoor air which has been taken in through the suction port of the prime mover compartment 112 to the radiator 26, and these pump 23, cooling plate 203, and radiator 26 are annularly connected in order by the liquid piping 22. Incidentally, the heating medium is not limited to the above-mentioned coolant and may be a liquid such as cooling water and so forth.

The electrical storage device 8 includes eight battery modules 202 (see FIG. 8 and FIG. 9) configured by connecting together, for example, six battery cells 200, and a heat exchange member which performs heat exchange with the plurality of battery cells 200 in this battery module 202, and this heat exchange member consists of the aforementioned cooling plate 203 which is arranged under, for example, the plurality of battery modules 202 via a thermal conducting sheet 204 and serves as a structure for cooling the plurality of battery cells 200. Incidentally, the number of the battery cells 200 in one battery module 202 is not limited to the above mentioned case of 6 and may be 1 to 5 or 7 or more. Likewise, the number of the battery modules 202 in the electrical storage device 8 is not limited to the above-mentioned case of 8 and may be 1 to 7 or 9 or more. In FIG. 4, for easy understanding of the description on the configuration of the temperature control device 20, an outline of one of the eight battery modules 202 is shown.

The battery module 202 is formed into a rectangular shape, for example, as shown in FIG. 5 and has the above-mentioned six battery cells 200 which have been laminated in a thickness direction, a cell holder 201 which is interposed between these respective battery cells 200 so as to define mutual positions of the adjacent battery cells 200, one pair of end plates 215 which nip and hold these battery cells 200 and the cell holders 201 from both thickness-direction sides of the respective battery cells 200, and four steel bands 216 which respectively couple together upper parts and lower parts of these end holders 215, and the respective battery cells 200, the cell holders 201 and the end plates 215 are integrally fixed with tensile force of the respective steel bands 216 in a state of leaving all of the bottom faces of the respective battery cells 200 exposed.

The cell holder 201 has a guide (not shown) which performs for example, positioning of the adjacent battery cells 200, and the relative positions of the respective battery cells 200 are regulated so as to almost match by this guide. The end plate 215 is fabricated by press-forming, for example, a steel material and a rigidity of such an extent that it does not warp with internal force of a group of the integrated battery cells 200 is ensured. Incidentally, a through-hole 218 into which a screw (not shown) for fixing the battery module 202 to the cooling plate 203 is to be inserted is bored in advance in the end plate 215.

Each battery cell 200 is configured by a lithium ion secondary battery and consists of, for example, an aluminum-alloy battery can 200C, a battery lid 200D which puts a lid on this battery can 200C, and an electrode group, an electrolyte and other necessary members (not shown) which are contained in a space defined by these battery can 200C and battery lid 200D and have been flatly wound, and the battery can 200C and the battery lid 200D are closely sealed such that the inside liquid does not leak to the outside. In addition, each battery cell 2200 has a characteristic that in an excessively low temperature state, a migration resistance of internal lithium ions becomes large and an internal resistance is increased and has a characteristic that in an excessively high temperature state, time-dependent change rates of degradation phenomena such as an increase in internal resistance, a reduction in capacity and so forth become large. Incidentally, each battery cell 200 may be configured by other batteries such as a nickel-metal-hydride battery, a nickel-cadmium battery and so forth and a capacitor, in place of the above-mentioned lithium ion secondary battery.

Further, the battery module 202 has a positive electrode terminal 200A and a negative electrode terminal 200B which are provided on the battery lid 200D individually separately and connected to the electrode group of the battery cell 200, an insulation member (not shown) which is interposed between these positive electrode terminal 200A and negative electrode terminal 200B and the battery lid 200D so as to mutually insulate the positive electrode terminal 200A and negative electrode terminal 200B and the battery lid 200D, and a safety valve and so forth (not shown) the strength of which has been set smaller than those of other parts in preparation for case of emergency that the internal pressure rises in association with overcharge of the battery cell 200.

The respective battery cells 200 are arranged in a state where the orientations are mutually reversed relative to the adjacent battery cells 200 such that the positive electrode terminal 200A and the negative electrode terminal 200B of the adjacent respective battery cells 200 come close. Then, the battery module 202 has a plurality of copper-alloy bus bars 217 for electrically connecting together the positive electrode terminals 200A and the negative electrode terminals 200B, each of these bus bars 217 is attached to the positive electrode terminal 200A and the negative electrode terminal 200B of the adjacent battery cells 200 and thereby the respective battery cells 200 can be efficiently series-connected with a shortest distance.

The cooling plate 203 is configured by a rectangular upper surface body 203A on which the battery cell 202 is to be placed, for example, as shown in FIG. 6, a sheet-shaped lower surface body 203B which is arranged under this upper surface body 203A and forms the bottom face, a U-shaped groove part 203C which is formed between these upper surface body 203A and lower surface body 203B and serves as a passage of the coolant, a fin 203D which is formed along this groove part 203C and is formed with a plurality of projections directing from the rear surface of the upper surface body 203A toward the lower surface body 203B, and one pair of pipeline connectors 212 which is provided on one side face of the upper surface body 203A so as to respectively connect the liquid piping 22 and the both ends of the groove part 203C. Accordingly, the cooling plate 203 consists of a hexahedron formed by the upper surface body 203A and the lower surface body 203B.

The upper surface body 203A and the lower surface body 203B are fabricated by casting an aluminum alloy, the surface of the upper surface body 203A is high accurately flattened and smoothed by being subjected to machining and has a screw hole (not shown) into which a screw (not shown) for fastening the battery module 202 is to be screwed. Then, the upper surface body 203A and the lower surface body 203B are integrated by screw fastening via a not shown sealing material and thereby airtightness of the cooling plate 203 can be ensured.

A thermal conducting sheet 204 consists of an insulating member which is formed into a sheet-shape by filling, for example, a silicon-based resin with a filler which is excellent in thermal conductivity and that the initial thickness of the thermal conducting sheet 204 is set to about 0.5 to 2 mm. Therefore, the thermal conducting sheet 204 has a function of suppressing conduction of the above-mentioned mutual aluminum alloy battery cans 200C which are conductors or of the battery can 200C and the cooling plate 203. On the other hand, a thermal conductivity in the thickness direction of the thermal conducting sheet 204 is comparatively heightened to 1 to 6 W/m/K.

In addition, the thermal conducting sheet 204 has a characteristic that it warps in the thickness direction under a comparatively small compressive load. A space between the bottom face of each battery cell 200 and the surface of the upper surface body 203A of the cooling plate 203 where the thermal conducting sheet 204 is interposed is regulated so as to become smaller than the thickness of the thermal conducting sheet 204 by, for example, about 10 to 30%. Thereby, even when the heights of the bottom faces of the respective battery cells 200 are varied to such an extent that it is unavoidable in manufacture of the battery cells 202, each battery cell 200 comes into sufficiently close contact with the thermal conducting sheet 204 owing to the warping characteristic of the thermal conducting sheet 204 and therefore the influence of variation can be suppressed. Incidentally, since the compressive load when the thermal conducting sheet 204 has warped by a fixed amount acts on the battery cells 200 and the battery modules 202 as counterforce, the battery module 202 and the cooling plate 203 are screw-fastened with comparatively large axial force.

When the pump 23 of the temperature control device 20 so configured is driven, the coolant which has been prepared by the radiator 26 is made to flow from the pipeline connector 212 on the exit side of the pump 23 into the groove part 203C of the cooling plate 203, flowing from the pump 23 in the liquid piping 22, to flow out of the pipeline connector 212 on the radiator 26 side by being guided by the fin 203D and thereafter to return to the radiator 26, flowing in the liquid piping 22. At this time, the coolant which flows through the groove part 203C of the cooling plate 203 draws heat from each battery cell 200 via the fin 203D, the upper surface body 203A and the thermal conducting sheet 204 and thereby the electrical storage device 8 can be cooled. In particular, since an inner-side surface area of the cooling plate 203 is ensured on the upper surface body 203A of the cooling plate 203 by forming the fin 203D, a contact area of the cooling plate 203 and the coolant can be expanded and the cooling efficiency of the cooling plate 203 can be improved.

In the first embodiment of the present invention, temperature sensors (not shown) such as thermistors, thermocouples and so forth for measuring the temperatures of the coolant and each battery cell 200 are provided in the liquid piping 22 on the coolant exit side of the cooling plate 203 and on each battery cell 200 and a temperature signal of the coolant that this temperature sensor has measured is output to the controller 11. Then, when the temperature of the battery cell 200 in the electrical storage device 8 which has been measured by the temperature sensor has become higher than a predetermined value, the controller 11 drives the pump 23 to circulate the coolant in the liquid piping 22 and thereby radiates heat from the battery cell 200 of the electrical storage device 8.

On the other hand, in a case where the hydraulic excavator is used in the period of winter and so forth, there are cases where the temperature of the battery cell 200 is lower than a suitable temperature. When the temperature of this battery cell 200 is excessively low, desired input/output cannot be obtained from the electrical storage device 8 due to the above-mentioned characteristic that the internal resistance (a loss) becomes large caused by lowering of activation of the lithium ions in the battery cell 200 and therefore it is necessary to warm up the electrical storage device 8.

Accordingly, in the first embodiment of the present invention, it is made to heighten the temperature of the battery cell 200 by using self-heating of the electrical storage device 8. That is, since the controller 11 actuates the assisting electricity generation motor 2 so as to repeat charge/discharge. (electric conduction) of the electrical storage device 8 and thereby the electrical storage device 8 generates heat in accordance with the internal resistance, the temperature of the battery cell 200 rises and the desired input/output can be obtained from the electrical storage device 8. At this time, the controller 11 stops the operation of the pump 23 of the temperature control device 20 in order to prevent the heat of the electrical storage device 8 from escaping to the coolant by the cooling plate 203.

Here, the electrical storage device 8 is liable to be exposed to the dust contained in the outdoor air and wind and rain because the suction port of the outdoor air is formed in the prime mover compartment 112 as mentioned above and in addition it is liable to repetitively receive comparatively large vibrations and shocks because the hydraulic excavator goes back and forth and operates on the complicated ground, and moreover there is the possibility that it may receive unexpected vibrations, shocks and so forth from each direction due to access of the body of the operator, tools and equipment such as the crane and so forth thereto in maintenance work such as maintenance, repairs and so forth of the inside of the revolving superstructure 110. Accordingly, it is necessary for the electrical storage device 8 to have high airtightness and mechanical strength in order to cope with them.

Figure 7:
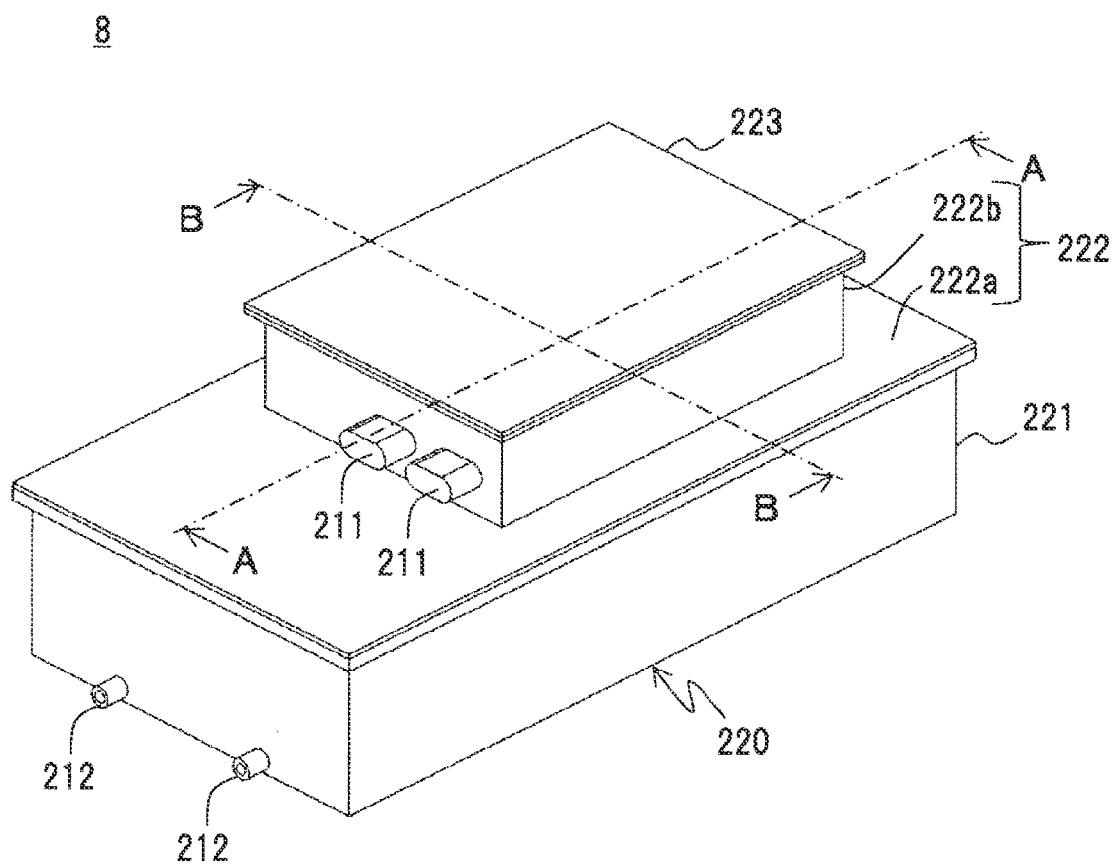
FIG. 7 is a perspective view showing the outer appearance of an electrical storage device according to the first embodiment of the present invention.

Next, a configuration of the electrical storage device 8 according to the first embodiment of the present invention will be described in detail. FIG. 7 is a perspective view showing the outside appearance of the electrical storage device according to the first embodiment of the present invention, FIG. 8 is a sectional diagram along A-A line in FIG. 7 and FIG. 9 is a sectional diagram along B-B line in FIG. 7.

Figure 8:
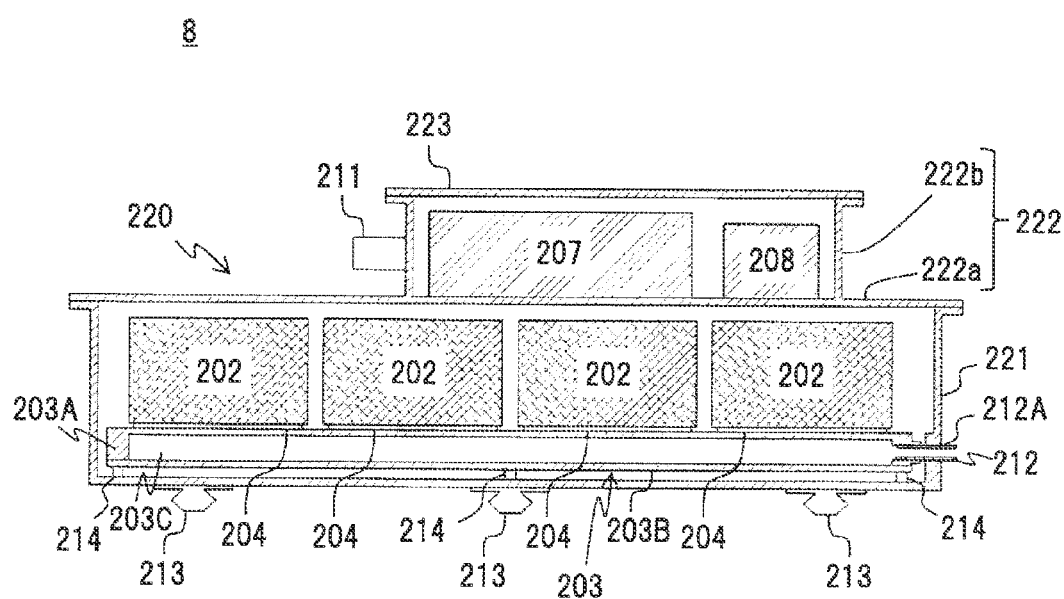
FIG. 8 is a sectional diagram along A-A line in FIG. 7.
Figure 9:
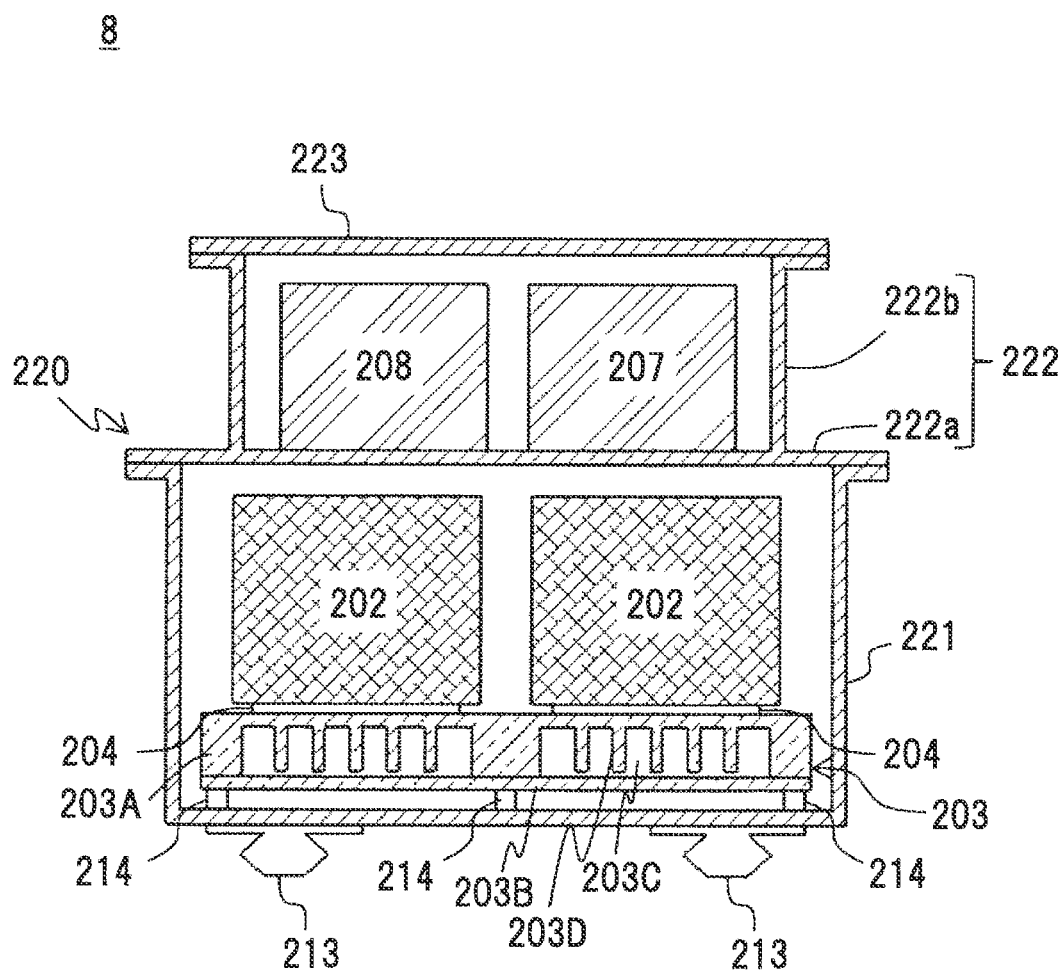
FIG. 9 is a sectional diagram along B-B line in FIG. 7.

As shown in FIG. 7 to FIG. 9, the electrical storage device 8 according to the first embodiment of the present invention includes a housing 220 which contains the plurality of battery modules 202 and covers them in a state of leaving the respective battery cells 200 of these battery modules 202 separated from one another and a thermal resistor which is interposed between this housing 220 and the cooling plate 203 so as to hinder heat transfer between the housing 220 and the cooling plate 203. Specifically, the housing 220 is configured, for example, by a lower housing 221 to be fixed onto the revolving frame ill, an intermediate housing 222 which is attached to an upper part of this lower housing 221 and an upper housing 223 which is attached to an upper part of this intermediate housing 222.

The lower housing 221 is configured by a rectangular volume body an upper surface of which is opened and contains the eight battery modules 202, the thermal conducting sheet 204, the cooling plate 203 and a later described projection 214. In the lower housing 221, the eight battery modules 202 are arranged such that four are arranged in a direction (a long-side direction of the lower housing 221)

along the groove part 203C which serves as the passage of the coolant, for example, as shown in FIG. 8 and every two are arranged in a direction (a short-side direction of the lower housing 221) crossing the groove part 203C as shown in FIG. 9 and are located above the groove part 203C which serves as the passage of the coolant.

Then, mutual terminals of the battery lids 200D which are located on laminated ends of the respective battery cell 200 are series-connected by the intervention of a disconnector switch (not shown) and each battery module 202 is fixed to an upper surface of the upper surface body 203A of the cooling plate 203 by screw fastening via the thermal conducting sheet 204 as mentioned above.

The above-mentioned thermal resistor is configured by the plurality of columnar projections 214 that, for example, upper ends are in contact with part of the lower surface body 203B of the cooling plate 203 and lower ends are in contact with part of a back-side face in the lower housing 221, and these projections 214 are fixed to the lower housing 221 with screws (not shown) passing through them in the up-down direction. In addition, each projection 214 is made of a resin material having a thermal conductivity which is smaller than both of the thermal conductivity of the housing 220 and the thermal conductivity of the cooling plate 203 and the thermal conductivity of this resin material is set to, for example, less than 1 W/m/K.

Accordingly, the cooling plate 203 is supported on an upper end of each projection 214, a height position from the lower housing 221 is defined and a gap corresponding to the height of the projection 214 is formed between mutually facing surfaces of the lower surface of the lower surface body 203B of the cooling plate 203 and part of the back-side face in the lower housing 221 where the projection 214 is not present.

In addition, the cooling plate 203 is arranged separately from a side face of the lower housing 221 on each projection 214 and dimensions and shapes of the cooling plate 203 and the lower housing 221 are set such that the gaps are also formed between mutually facing surfaces of four side faces of the cooling plate 203 and four side faces of the lower housing 221. Then, since each projection 214 is the resin material and therefore can be easily formed in accordance with the dimensions and the shapes of these cooling plate 203 and lower housing 221, the degree of freedom of arrangement of the cooling plate 203 and the lower housing 221 can be heightened. Incidentally, one pair of through-holes 212A through which the respective pipeline connectors 212 of the cooling plate 203 pass to the outside is bored in a lower part of one side face of the lower housing 221 and a plurality of pieces of anti-vibration rubber 213 which mitigate the vibrations and the shocks that the electrical storage device 8 on the revolving frame 111 receives in association with the operation of the hydraulic excavator are attached to the bottom face of the lower housing 221.

The intermediate housing 222 is configured by an intermediate plate 222a which puts a lid on an opening in the lower housing 221 so as to seal the lower housing 221, and an intermediate volume body 222b which is a rectangular volume body which is fixed to an upper surface of this intermediate plate 222a and an upper surface of which is opened. This intermediate volume body 222b contains a battery control unit 207 which controls input/output of the electric power of each battery cell 200, a relay 208, and the above-mentioned disconnector switch and so forth for temporarily breaking a battery circuit in maintenance work, and these battery control unit 207, relay 208 and disconnector switch and so forth are fixed onto the intermediate plate 222a. Incidentally, the size of the intermediate volume body 222b of the intermediate housing 222 is set smaller than the size of the lower housing 221.

In addition, a power connector 211 which performs input/output of the electric power between the battery cell 200 group in the lower housing 221 and the outside is attached to one side face of the intermediate volume body 222b, and an end terminal of each of the battery modules 202 which are series-connected in the lower hosing 221 is connected to the power connector 211 by a not shown predetermined harness.

The upper housing 223 is configured by an upper plate which puts a lid on an opening of the intermediate volume body 222b to seal the intermediate volume body 222b. The electrical storage device 8 forms the external form by the lower housing 221, the intermediate housing 222 and the upper housing 223 in this way and mechanically integrates respective constitutional components which are built in the lower housing 221 and the intermediate housing 222.

Then, these lower housing 221, intermediate housing 222 and upper housing 223 consist of, for example, aluminum-alloy castings with a metal of aluminum being made as a principal component. Thereby, since the electrical storage device 8 can ensure airtightness of the inside and can obtain sufficient strength against the vibrations and the shocks in association with the operation of the hydraulic excavator, each constitutional component in the housing 220 can be protected and durability of the electrical storage device 8 can be improved. Incidentally, the lower housing 221, the intermediate housing 222 and the upper housing 223 are relatively fixed by, for example, not shown screws and sealing materials and thicknesses of these respective housings 221, 222, 223 are set to, for example, 3 to 8 mm.

In addition, the electrical storage device 8 is arranged between the radiator 26 and a frame 112A of the prime mover compartment 112, for example, as shown in FIG. 3. Therefore, since the housing 220 of the electrical storage device 8 is liable to be exposed to the outdoor air which is guided to the radiator 26 by the fan 27 and a distance from a hydraulic system 90 and the engine 1 and so forth which serve as heat sources is ensured, excessive rising of the temperature of the housing 220 can be suppressed. Further, since the housing 220 is shielded from sunlight with the frame 112A of the prime mover compartment 112, it can prevent the electrical storage device 8 from being damaged.

Next, operational effects of the first embodiment of the present invention will be described.

In a case of warming up the electrical storage device 8 according to the first embodiment of the present invention, self-heating of the electrical storage device 8 is used as mentioned above, and the controller 11 actuates the assisting electricity generation motor 2 so as to repeat charge/discharge (electric conduction) of the electrical storage device 8 and thereby the electrical storage device 8 generates heat in accordance with the internal resistance. Although most of generated heat of this electrical storage device 8 is brought about by the internal resistance of each battery cell 200 which is built therein, part thereof is brought about by the internal resistance of a peripheral component into which an electric current flows and each amount of heat generation thereof has a value that the internal resistance is multiplied by a square of the electric current at the time of input/output.

In the electrical storage device 8, most of the generated heat which is brought about by the battery cells 200 propagates from the battery can 200C in order of the upper surface body 203A of the cooling plate 102, the coolant in the cooling plate 203 and the lower surface body 203B. Then, the heat which has propagated to the lower surface body 203B propagates to the entire of the housing 220 of the lower housing 221, the intermediate housing 222 and the lower housing 223 via the projections 214 and the heat which has propagated to this housing 220 is radiated from the surface of the housing 220 to the outdoor air. At this time, the amount of heat radiated from the housing 220 to the outdoor air is determined by an effective area and a heat transfer coefficient of the surface of the housing 220 and the larger these effective area and heat transfer coefficient are, the more it is increased. In particular, the more an air flow of the outdoor air is increased (the stronger the wind is), the larger the heat transfer coefficient becomes.

In addition the part of the generated heat which is brought about by the battery cells 200 migrates between the adjacent battery cells 200 through the positive electrode terminal 200A, the negative electrode terminal 200B and the bus bar 217 of the battery lid 200D and finally propagates to the outside via the power connector 211. Such a heat transmission form is heat conduction and radiation and convection in the air are partially included.

Here, respective members of the thermal conducting sheet 204, the cooling plate 203, the coolant and the housing 220 to which the heat of the battery cells 200 mainly propagates each has a heat capacity determined by specific heat and the size (the volume or the mass) which are peculiar physical property values. This heat capacity is obtained by a product of the specific heat and the size and the larger the both are, the larger it becomes. In addition, in a case where different members are thermally coupled, the total heat capacity of the whole becomes the sum of the heat capacities of the respective members. Then, the member which is larger in heat capacity becomes gentler in temperature change relative to the heat transferred. Accordingly, in the thermal conducting sheet 204, the cooling plate 203 which stores the coolant therein, the projection 214 and the housing 220 through which the heat of the battery cell 200 propagates, in particular, the heat capacities of the cooling plate 203 and the housing 220 are large and transfer of the heat of the battery cells 200 is liable to be performed.

On the other hand, as an index indicating the difficulty in conducting heat, there exists thermal resistance which acts between the respective members and it is expressed by a reciprocal number of the thermal conductivity and the heat transfer coefficient. Since the larger this thermal resistance is, the more heat transfer between the respective members is hindered and the thermal insulation property in the vicinity of the heat source is heightened, the temperature of the member in the vicinity of the heat source can be intensively heightened. In addition, the longer the heat transfer distance of the member is, the larger the thermal resistance becomes, and the smaller the contact area with another member is at the interface of the members, the larger it becomes.

According to the first embodiment of the present invention which is configured as mentioned above, each battery module 202, the thermal conducting sheet 204 and the cooling plate 203, and the housing 220 are separated from one another and heat migration between the cooling plate 203 and the housing 220 is disturbed by each projection 214 by interposing the plurality of projections 214 acting as the thermal resistance between the cooling plate 203 and the housing 220 between which transfer of heat of the battery cells 200 is liable to be performed. Therefore, escaping of heat of each battery cell 200 from the thermal conducting sheet 204 to the housing 220 through the cooling plate 203 can be suppressed. Thereby, since the heat insulation property in the vicinity of each battery cell 200 is heightened, the temperature control efficiency of the electrical storage device 8 can be improved.

Accordingly, when warming up the electrical storage device 8 as done at the time of start-up of the hydraulic excavator in winter and so forth, the temperature of each battery cell 200 can be rapidly raised by repeating charge/discharge (electric conduction) of the electrical storage device 8. Therefore, since the vehicle body can be operated in a short time, the performance of the hydraulic excavator can be heightened. Thereby, the hydraulic excavator which is excellent in usability can be provided. In addition, since the time taken for warming up the electrical storage device 8 can be shortened, a consumption amount of energy required for warming up the electrical storage device 8 is reduced and deterioration of the battery cells 200 due to charge/discharge which does not actually work can be suppressed.

In particular, since initial temperature rising in a warm-up process of the electrical storage device 8 can be hastened, the internal resistance of each battery cell 200 is reduced early and thereby the electric current to be conducted to the electrical storage device 8 can be increased. Thereby, since the above-mentioned amount of generated heat of the electrical storage device 8 becomes large, temperature rising speeds of the respective battery cells 200 can be correlatively heightened. Further, even if the hydraulic excavator is placed under the gale environment and is in a state that heat of the housing 220 is liable to be radiated into the air, heat migration from the cooling plate 203 to the housing 220 will be suppressed because the thermal resistance between the interface of the cooling plate 203 and the interface of the housing 220 is heightened by each projection 214 and the temperature rising speed of each battery cell 200 will be saved from being hindered.

In addition, in the first embodiment of the present invention, since the areas of the both end faces of each projection 214 are made smaller than the area of the lower surface of the cooling plate 203 and the area of the back-side surface in the lower housing 221 of the housing 220 and contact between the upper end of each projection 214 and the lower surface body 203B and contact between the lower end of each projection 214 and the lower housing 221 are limited to a range of the areas of the both end faces of each projection 214, the thermal resistance between the cooling plate 203 and the housing 220 can be heightened. Thereby, since transmission of heat between the cooling plate 203 and the housing 220 can be easily blocked, the electrical storage device 8 can be efficiently warmed up.

In addition, in the first embodiment of the present invention, since the respective internal constitutional members are protected by the housing 220 which configures the external form of the electrical storage device 8 as described above and the vibrations and the shocks in association with the operation of the hydraulic excavator do not directly act on the cooling plate 203, the sheet thicknesses of the upper surface body 203A and the lower surface body 203B of the cooling plate 203 can be made small. Thereby, since the heat capacity of the cooling plate 203 can be reduced, migration of heat from each battery cell 200 to the cooling plate 203 can be suppressed in the warm-up process of the electrical storage device 8 and the temperature of each battery cell 200 can be raised earlier.

In addition, the first embodiment of the present invention can rapidly perform selection of the resin material which is suited as the thermal resistor between the cooling plate 203 and the housing 220 by using the resin material of less than 1 W/m/K which is smaller than the thermal transfer coefficients of the aluminum-alloy cooling plate 203 and housing 220 for each projection 214. Thereby, the time and labor in an assembling process of the electrical storage device 8 can be saved.

Incidentally, although the above-mentioned first embodiment of the present invention has been described in regard to a case where self-heating has been utilized as the heat source for warming up the electrical storage device 8, for example, a planar heater may be installed on the cooling plate 203 and generated heat of this planar heater may be utilized, not limited to this case. In addition, although the first embodiment of the present invention has been described in regard to a case where the resin material is used for each projection 214, other nonmetallic materials may be used in place of the resin material, not limited to this case.

Further, in the first embodiment of the present invention, a case where the thermal conductivity of each projection 214 is smaller than both of the thermal conductivity of the housing 220 and the thermal conductivity of the cooling plate 203 has been described, if the thermal conductivity of each projection 214 is smaller than any one of the thermal conductivity of the housing 220 and the thermal conductivity of the cooling plate 203, it may be set larger than the other or it may be at least 1 W/m/K, not limited to this case. In addition, although in the first embodiment of the present invention, a case where the cooling plate 203 and the housing 220 are fabricated by using the aluminum alloy, they may be fabricated by using other materials in place of the aluminum alloy, not limited to this case.

Further, although the first embodiment of the present inversion has been described in regard to a case where the bottom face of each battery cell 200 are exposed in the battery module 202, for example, the bottom face of each battery cell 200 may be covered with an insulator such as a resin film and so forth within a range not influencing heat transmission between each battery cell 200 and the thermal conducting sheet 204. Thereby, even if condensation and so forth has occurred on the battery module 202, the bottom face of each aluminum-alloy battery can 200C can be protected by the insulator and therefore a defect that each battery can 200C is electrically conducted and short-circuited can be avoided. In addition, although the first embodiment of the present invention has been described in regard to a case where the respective battery cells 200 and the respective battery modules 202 are series-connected, for example, the respective battery cells 200 and the respective battery modules 202 may be parallel-connected, not limited to this case.

Second Embodiment

Figure 10:
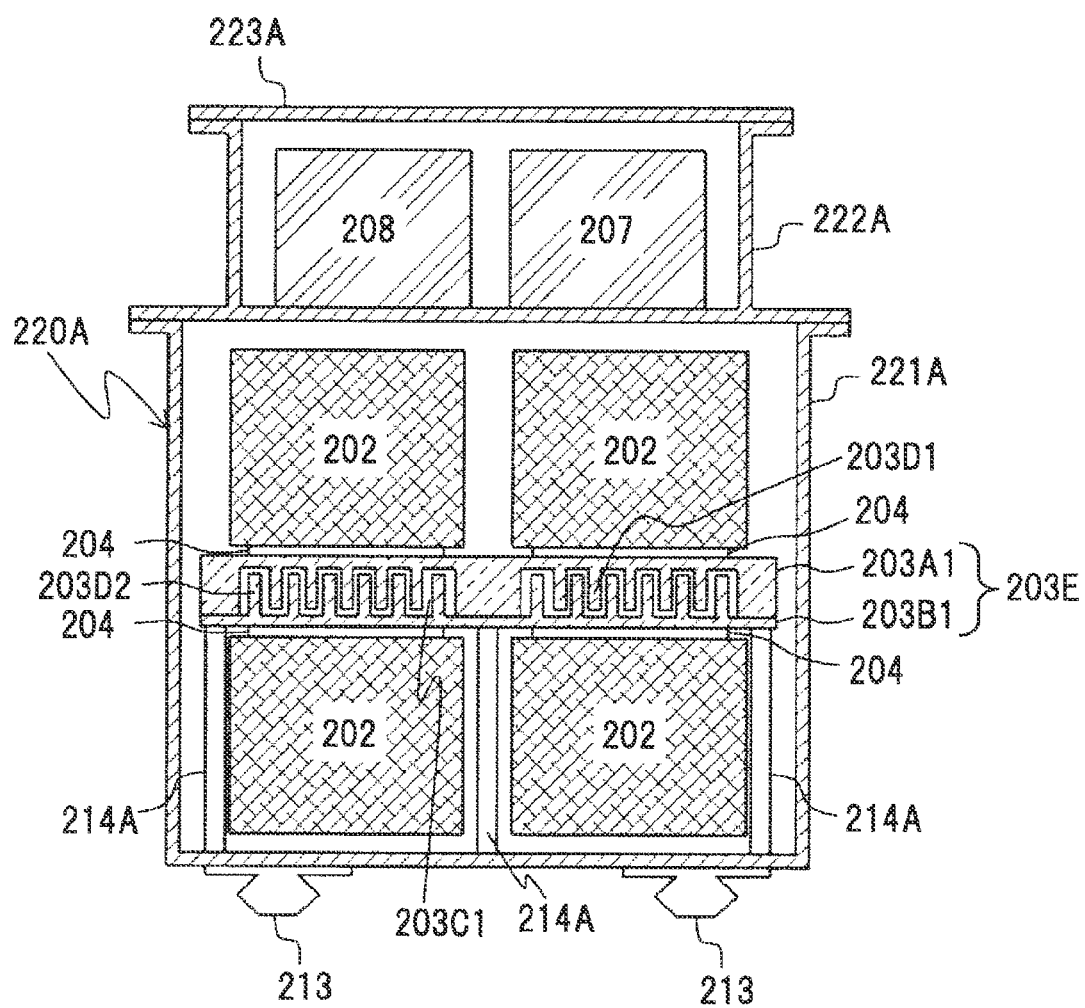
FIG. 10 is a diagram explaining a configuration of an electrical storage device according to a second embodiment of the present invention, a sectional diagram corresponding to FIG. 9.

FIG. 10 is a diagram explaining a configuration of an electrical storage device according to a second embodiment of the present invention and is a sectional diagram corresponding to FIG. 9. Incidentally, in the following description on the second embodiment of the present invention, the same numerals are assigned to the same parts as those in the above-mentioned first embodiment.

The second embodiment of the present invention is different from the aforementioned first embodiment in that while in the first embodiment, the eight battery modules 202 are arranged above the upper surface body 203A of the cooling plate 203 via the thermal conducting sheet 204 as shown in FIG. 8, FIG. 9, in the second embodiment, for example, as shown in FIG. 10, in the eight battery modules 202, the four battery modules 202 are arranged above an upper surface body 203A1 of a cooling plate 203E and the remaining four battery modules 202 are arranged under a lower surface body 203B1 of the cooling plate 203E.

Specifically, in the second embodiment of the present invention, the cooling plate 203E has, for example, a plurality of fins 203D2 which are formed along a groove part 203C1 similarly to a fin 203D1 formed on the upper surface body 203A1 and have been projected from an upper surface of the lower surface body 203B1 toward a recessed part in a lower surface of the upper surface body 203A1. Accordingly, the coolant which has flown through the liquid piping 22 of the cooling circuit 21 into the groove part 203C1 will flow through gaps of these respective fins 203D1, 203D2.

Then, the respective battery modules 202 above the upper surface body 203A1 of the cooling plate 203E are arranged in a direction (in a depth direction of the paper shown in FIG. 10) along the groove part 203C1 and in a direction crossing the groove part 203C1 two by two and are fixed to an upper surface of the upper surface body 203A1 of the cooling plate 203E by screw fastening via the thermal conducting sheet 204. On the other hand, the respective battery modules 202 under the lower surface body 203B1 of the cooling plate 203E are arranged in the direction along the groove part 203C1 and in the direction crossing the groove part 203C1 two by two and are fixed to a lower surface of the lower surface body 203B1 of the cooling plate 203E by screw fastening via the thermal conducting sheet 204. Accordingly, a loading surface of each battery module 202 is arranged in parallel with a back-side face in a lower housing 221A. Incidentally, a gap is formed between each battery module 202 under the lower surface body 203B1 of the cooling plate 203E and the back-side face in the lower housing 221A.

In addition, a size of the lower housing 221A of a housing 220A according to the second embodiment of the present invention in a direction along the grove part 203C1 is set short in comparison with that of the lower housing 221 according to the first embodiment and a depth of the lower housing 221A according to the second embodiment is set large in comparison with that of the lower housing 221 according to the first embodiment. Further, a length of each projection 214A according to the second embodiment of the present invention is set large in comparison with that of each projection 214 according to the first embodiment in association with arrangement of the battery modules 202 not only above but also under the cooling plate 203E. Other configurations are the same as those of the first embodiment and duplicated description is omitted.

According to the second embodiment of the present invention which is configured in this way, since the same operational effects as those of the above-mentioned first embodiment can be obtained and in addition heat exchange between each battery cell 200 and the coolant can be promoted via the thermal conducting sheet 204 from both surfaces of the upper surface of the upper surface body 203A1 and the lower surface of the lower surface body 203B1 of the cooling plate 203E, the mounting efficiency of the cooling plate 203E can be heightened. Thereby, since the respective battery cells 200 in the eight battery modules 202 can be efficiently cooled by one cooling plate 203E, the time required for heat exchange of each battery modules 200 can be shortened and the cooling efficiency by the cooling plate 203E can be heightened. In particular, since even though the battery module 202 is arranged under the cooling plate 203E, the fin 203D2 is formed also on the lower surface body 203B1 similarly to the upper surface body 203A1, each battery cell 200 above the cooling plate 203E and each battery cell 200 under it can be uniformly cooled. Thereby, a variation in temperature of the respective battery cells 200 can be suppressed.

In addition, since the second embodiment of the present invention has been made so as to arrange the half of the eight battery modules 202 which are arranged above the cooling plate 203 in the first embodiment under the cooling plate 203E, the size of the housing 220A in the direction along the groove part 203C1 can be made small. Thereby, a mounting floor area of an electrical storage device 8A on the hydraulic excavator can be reduced. Then, also a volume of the cooling plate 203E can be reduced and therefore miniaturization of the electrical storage device 8A can be promoted and it can also contribute to space saving of the hydraulic excavator.

In addition, since the length of the groove part 203C1 which will serve as the passage of the coolant which flows inside the cooling plate 203E becomes small, the second embodiment of the present invention can reduce a pressure loss of the coolant in this groove part 203C1. Thereby, the energy efficiency of the cooling circuit 21 can be heightened and therefore the smaller pump 23 can be adopted in the cooling circuit 21.

In addition, since the length of each projection 214A is set large in comparison with that of each projection 214 according to the first embodiment and the heat transfer distance of each projection 214A becomes long, the second embodiment of the present invention can make the thermal resistance acting between the cooling plate 203E and the lower housing 221A large. Thereby, the heat insulation property in the vicinity of each battery cell 200 is heightened and therefore the temperature control efficiency of the electrical storage device 8A can be more improved.

Incidentally, although the above-mentioned second embodiment of the present invention has been described in regard to a case where the loading surface of each battery module 202 are arranged in parallel with the back-side face in the lower housing 221A, for example, the loading surface of each battery module 202 may be arranged vertically to the back-side face of the lower housing 221A, not limited to this case.

Third Embodiment

Figure 11:
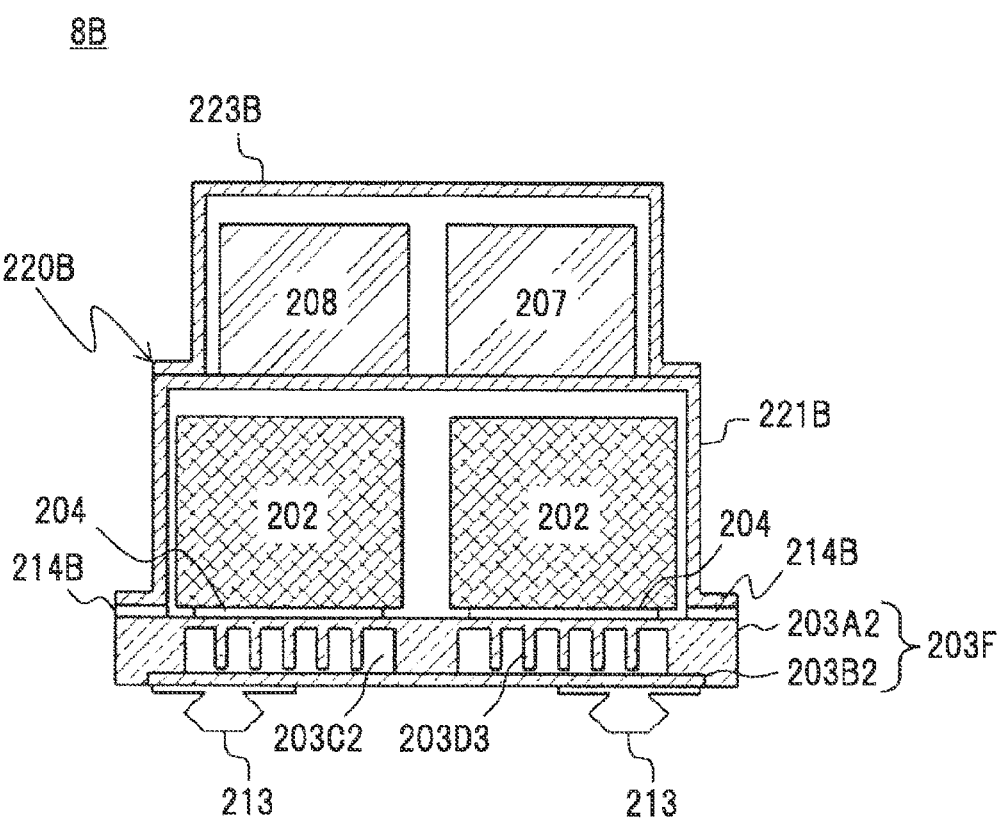
FIG. 11 is a diagram explaining a configuration of an electrical storage device according to a third embodiment of the present invention, a sectional diagram corresponding to FIG. 9.

FIG. 11 is a diagram explaining a configuration of an electrical storage device according to a third embodiment of the present invention and is a sectional diagram corresponding to FIG. 9. Incidentally, in the following description on the third embodiment of the present invention, the same numerals are assigned to the same parts as those in the above-mentioned first embodiment.

The third embodiment of the present invention is different from the aforementioned first embodiment in that while in the first embodiment, the housing 220 is configured by the lower housing 221, the intermediate housing 222 and the upper housing 223 as shown in FIG. 7 to FIG. 9 and the upper surfaces of the lower housing 221 and the intermediate housing 222 are opened, in the third embodiment, for example, as shown in FIG. 11, a housing 220B is configured by a lower housing 221B and an upper housing 223B with the exception of the intermediate housing 222 and lower surfaces of the lower housing 221B and the upper housing 223B are opened.

Specifically, in the third embodiment of the present invention, the lower housing 221B of the housing 220B is configured by, for example, a rectangular volume body a lower surface of which is opened, the upper housing 223B is configured by, for example, a rectangular volume body a lower surface of which is opened similarly to the lower housing 221B, and the volume of the lower housing 221B is set larger than the volume of the upper housing 223B.

Then, the lower housing 221B contains the battery module 202 and the thermal conducting sheet 204 in a state of leaving the respective battery modules 202 arranged above a cooling plate 203F via the thermal conducting sheet 204 similarly to the above-mentioned first embodiment, in a state of leaving each battery module 202 and the thermal conducting sheet 204 separated through an opening from above each battery module 202 and an opening end of the lower housing 221B is fixed to an upper surface body 203A2 of the cooling plate 203F by screw fastening. In addition, the upper housing 223B contains the battery control unit 207 and the relay 208 through an opening from above these battery control unit 207 and relay 208 in a state of leaving the battery control unit 207 and the relay 208 fixed to an upper surface of the lower housing 221B and an opening end of the upper housing 223B is fixed to the upper surface of the lower housing 221B by screw fastening.

A thermal resistor according to the third embodiment of the present invention is configured by a plurality of thermal resistance materials 214B which are interposed between the opening end of the lower housing 221B and the upper surface body 203A2 of the cooling plate 203F and hinder heat transfer between the housing 220B and the cooling plate 203F, in place of the projection 214 according to the first embodiment. These thermal resistance materials 214B are made of incombustible PBT (polybutylene terephthalate) having a thermal conductivity which is smaller than thermal conductivities of, for example, the aluminum-alloy cooling plate 203F and housing 220B and are formed into a sheet-like shape. In addition, a thickness of the thermal resistance material 214B corresponds to a space between the opening end of the lower housing 221B and the upper surface body 203A of the cooling plate 203F and is set, for example, within a range of 1.5 to 6 mm.

Accordingly, a lower surface body 203B2 of the cooling plate 203F is not covered with the lower housing 221B and is exposed and the plurality of pieces of anti-vibration rubber 213 are attached to a lower surface of the lower surface body 203B. Incidentally, the opening end of the lower housing 221B and the upper surface body 203A of the cooling plate 203F may be made to be in direct contact with each other with no interposition of the thermal resistance materials 214B in the vicinity of a part to be screw-fastened between the opening end of the lower housing 203B and the upper surface body 203A2 of the cooling plate 203F. Thereby, since loosening by permanent deformation in association with the matter that the thermal resistance material 214B is compressed with axial force of a screw (not shown) for fixing together the opening end of the lower housing 221B and the upper surface body 203A2 of the cooling plate 203F is suppressed and the airtightness of the lower housing 221B can be maintained, the reliability of an electrical storage device 8B can be sufficiently obtained.

According to the third embodiment of the present invention which is configured in this way, since the thermal resistance of the lower housing 221B and the cooling plate 203F can be maintained high by interposing the thermal resistance materials 214B between the opening end of the lower housing 221B and the upper surface body 203A2 of the cooling plate 203F, in place of the projections 214 according to the first embodiment and also an area of the cooling plate 203F exposed to the outside is limited, the same operational effects as those of the above-mentioned first embodiment can be obtained.

In addition, in the third embodiment of the present invention, since the opening of the lower housing 221B of the housing 220B is directed downward and thereby a space around each battery module 202 is opened in a state where the housing 220B is not yet attached to the cooling plate 203F in the assembling process of the electrical storage device 8B, the operator can easily perform work such as connection of wiring, screw fastening and so forth of the respective battery cells 200 in these battery modules 202. Likewise, since the opening of the upper housing 223B is directed downward, the operator can easily perform also work such as connection of wiring, screw fastening and so forth of the battery control unit 207 and the relay 208. Thereby, the efficiency of installation work of the electrical storage device 8B can be improved.

In addition, since the third embodiment of the present invention has been made so as to fix the opening end of the lower housing 221B to the upper surface body 203A of the cooling plate 203F so as to expose the lower surface body 203B2 of the cooling plate 203F, the height of the housing 220B can be made small in comparison with a case where the lower housing 221 has contained the whole of the cooling plate 203 in the first embodiment. Thereby, the electrical storage device 8b can be miniaturized.

Incidentally, although the above-mentioned third embodiment of the present invention has been described in regard to a case where PBT (polybutylene terephthalate) has been used for the thermal resistance material 214B, if the heat resistance material 214B acts as the thermal resistance between the respective members, it may be one other than PBT (polybutylene terephthalate) and the thermal resistance material 214B may have a function of a sealing material in addition to a function of the thermal resistance, not limited to this case. In addition, also the thickness of the thermal resistance material 214B is not limited to the above-mentioned range of 1.5 to 6 mm.

Fourth Embodiment

Figure 12:
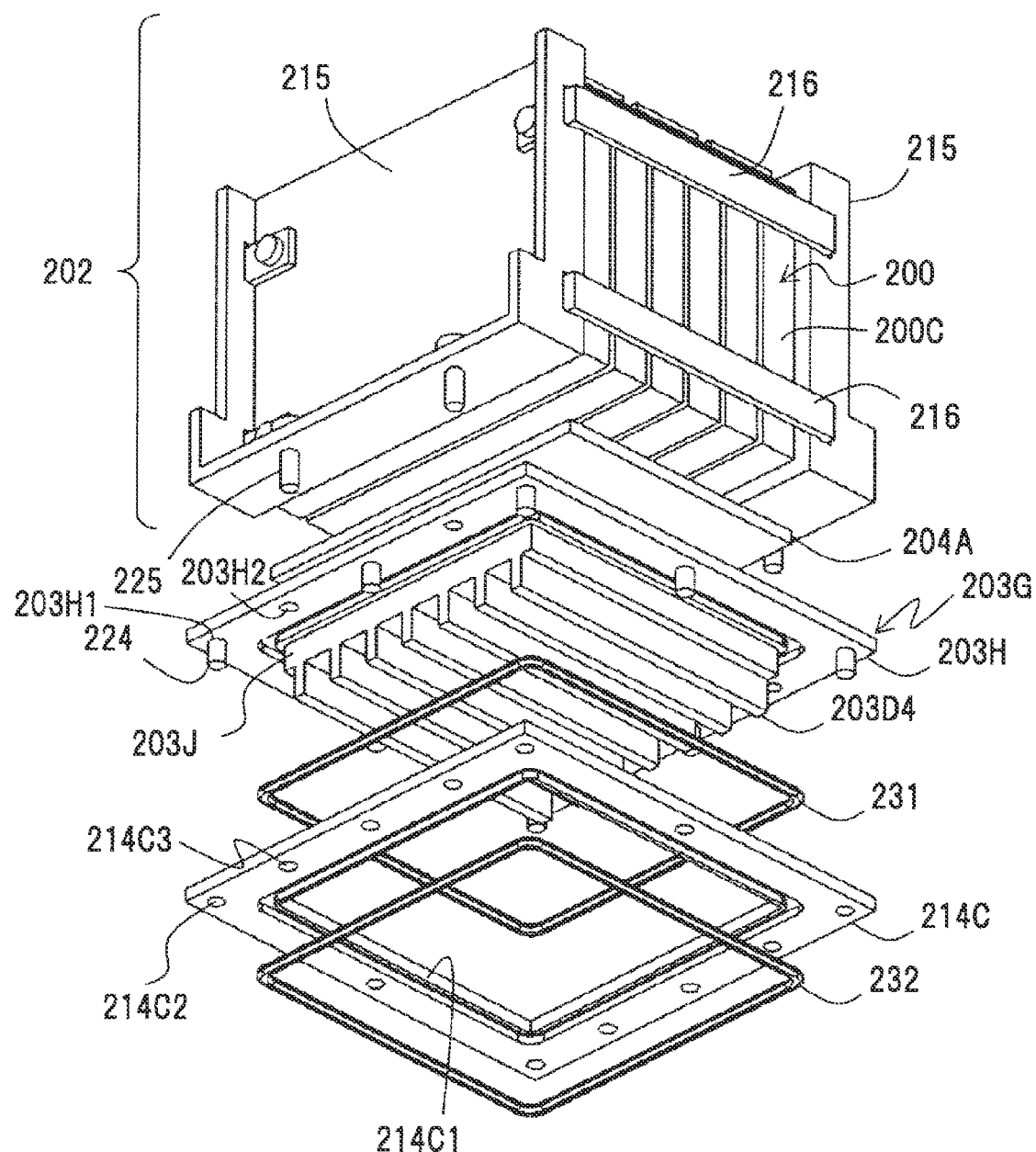
FIG. 12 is a diagram explaining configurations of a battery module according to a fourth embodiment of the present invention and of members to be integrated with this battery module.
Figure 13:
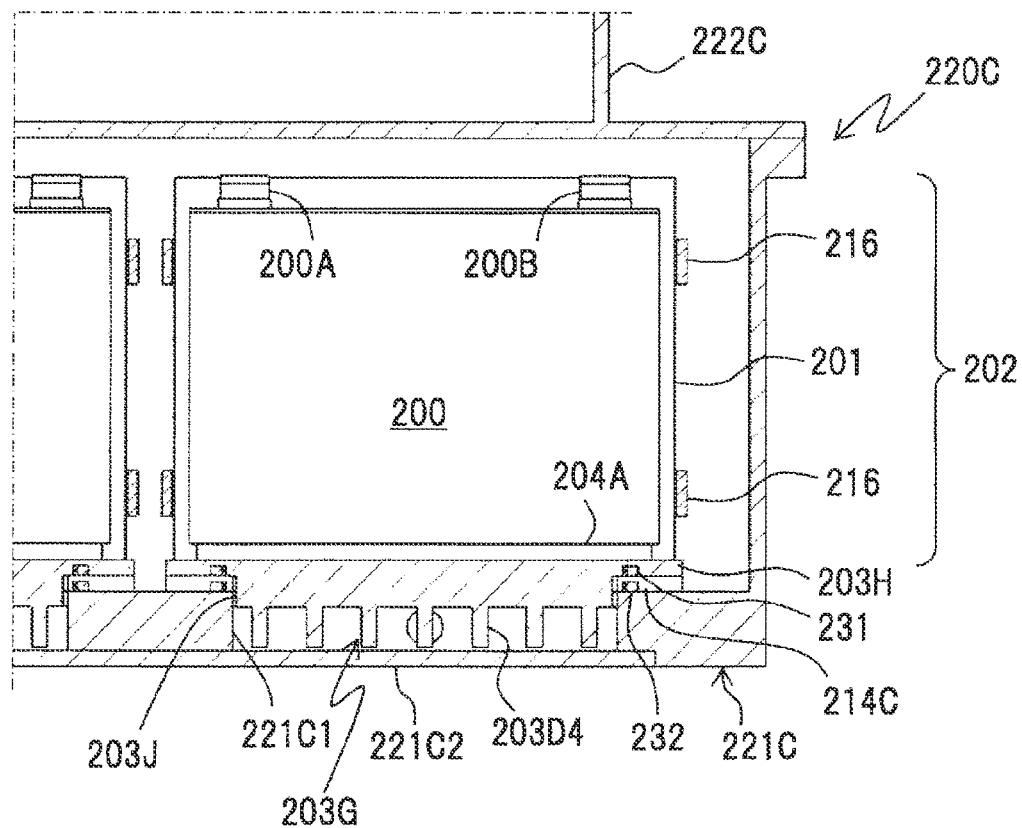
FIG. 13 is a diagram explaining a configuration of an electrical storage device according to a fourth embodiment of the present invention, a diagram enlargedly showing a sectional diagram corresponding to FIG. 9.

FIG. 12 is a diagram explaining configurations of a battery module according to a fourth embodiment of the present invention and members to be integrated with this battery module, and FIG. 13 is a diagram explaining a configuration of an electrical storage device according to the fourth embodiment of the present invention and is a diagram enlargedly showing a sectional diagram corresponding to FIG. 9. Incidentally, in the following description on the fourth embodiment of the present invention, the same numerals are assigned to the same parts as those of the above-mentioned first embodiment.

The fourth embodiment of the present invention is different from the aforementioned first embodiment in that while in the first embodiment, as shown in FIG. 8, FIG. 9, the heat exchange member is arranged under the eight battery modules 202 via the thermal conducting sheet 204 and is configured by one cooling plate 203 which cools the respective battery cells 200, in the fourth embodiment, for example, as shown in FIG. 12, FIG. 13, it is configured by eight cooling members 203G which are respectively arranged under the eight battery modules 202 and cool the respective battery cells 200.

Specifically, in the fourth embodiment of the present invention, a thermal conducting sheet 204A has an area which is comparable to, for example, an area of the whole region of the bottom face of the battery can 200C of each battery cell 200 and a lower surface of each cell holder 201 in the battery module 202 and is arranged such that an upper surface is in contact with the entire bottom face of the battery can 200C of each battery cell 200.

In addition, the cooling member 203G is configured by a base 203J having an area which is comparable to, for example, the area of the thermal conducting sheet 204, a fin 203D4 formed with a plurality of projections directing from the bottom face of this base 203J downward, and a rectangular fin plate 203H which is interposed between the thermal conducting sheet 204A and the cooling member 203G and performs positioning of the fin 203D4, and a size in a horizontal direction of this fin plate 203H is set to be comparable to, for example, a footprint, that is, a mounting floor area of the battery module 202.

Then, the base 203J of the cooling member 203G is fixed to a central part of the fin plate 103H. Incidentally, in an upper surface of the fin plate 203H, part which is in contact with the thermal conducting sheet 204A is highly accurately flattened and smoothed by being subjected to machining. In addition, the fin plate 203H is fabricated by further performing secondary working after, for example, an aluminum alloy is subjected to extrusion molding in a longitudinal direction of the fin 203D4.

A thermal resistor according to the fourth embodiment of the present invention consist of a plurality of thermal resistance materials 214C which are respectively arranged under the eight battery modules 202 and hinder heat transfer between a housing 220C and the cooling member 203G. This thermal resistance material 214C is made of, for example, PBT (polybutylene terephthalate) as in the third embodiment, has an opening part 214C1 which contains the base 203J of the cooling member 203G therein, and the external form is formed into a rectangular frame-like shape which matches the shape of part around the fin plate 203H. That is, a size in the horizontal direction of the thermal resistance material 214C is set to be comparable to the footprint of the battery module 202 similarly to the fin plate 203H.

In addition, an electrical storage device 8C includes a sealing material 231 which is interposed between the fin plate 203H and the thermal resistance material 214C and seals an interface of these fin plate 203H and thermal resistance material 214C, a sealing material 232 which is interposed between the thermal resistance material 214C and a lower housing 221C and seals an interface of these thermal resistance material 214C and lower housing 221C, a plurality of screws 224 which integrally fix the fin plate 203H and the thermal resistance material 214C to the lower housing 221C, and a plurality of screws 225 which integrally fix the battery module 202, the thermal conducting sheet 204, the cooling member 203G, the thermal resistance material 214C and the respective sealing materials 231, 232 to the lower housing 221C. Incidentally, pluralities of through-holes 203H1, 214C2 into which the respective screws 224 are to be inserted and pluralities of through-holes 203H2, 214C3 into which the respective screws 225 are to be inserted are respectively bored in the fin plate 203H and the thermal resistance material 214C.

The lower housing 221C has a through-hole 221C1 which is bored in the bottom part and into which a lower part of the base 203J of the cooling member 203G and the fin 203D4 are to be inserted, and a bottom plate 221C2 which puts a lid on this through-hole 221C1 from below. Accordingly, a region which is defined by the cooling member 203G, the bottom part of the lower housing 221C and the bottom plate 221C2 serves as the passage of the coolant. Incidentally, a size of a plate thickness of the bottom part of the lower housing 221C is set such that a gap is formed between the fin 203D4 and the bottom plate 221C2.

In the assembling process of the electrical storage device 8C so configured, first, in a state of bringing the fin plate 203H of the cooling member 203G into contact with the thermal resistance material 214C via the sealing material 231 and leaving the thermal material 214C in contact with a back-side face in the lower housing 221C via the sealing material 232, the screws 224 are inserted into the through-holes 203H1 in the fin plate 203H and the through-holes 214C2 in the thermal resistance material 214C and are screwed into tapped holes (not shown) in the lower housing 221C and thereby the cooling member 203G, the thermal resistance material 214C and the respective sealing materials 232, 232 are integrated together.

Then, after the thermal conducting sheet 204A has been attached to an upper surface of the fin plate 203H, in a state of leaving the end plate 215 of the battery module 202 in contact with the fin plate 203H, the screws 225 are inserted into the through-holes 218 in the end plate 215, the through-holes 203H2 in the fin plate 203H and the through-holes 214C3 in the thermal resistance material 214C and are screwed into tapped holes (not shown) in the lower housing 221C and thereby the battery module 202 and the thermal conducting sheet 204A are integrated with the cooling member 203G, the thermal resistance material 214C and the respective sealing materials 232, 232 and the electrical storage device 8C is assembled.

According to the forth embodiment of the present invention which is configured as mentioned above, since the thermal resistance of the lower housing 221C and the cooling member 203G can be maintained high by interposing the thermal resistance material 214C between the bottom part of the lower housing 221C and the fin plate 203H of the cooling member 203G in place of the projections 214 according to the first embodiment, the same operational effects as those of the above-mentioned first embodiment can be obtained.

In addition, since the sizes in the horizontal direction of the fin plate 203H and the thermal resistance material 214C located under each battery module 202 are set to be comparable to the footprint of each battery module 202, the fourth embodiment of the present invention can hold each cooling member 203G and each thermal resistance material 214C compactly under each battery cell 202. Thereby, there is no need to excessively widen a loading interval of the adjacent battery modules 202 and a high loading density can be implemented. Accordingly, since the size of the housing 220C can be made small, the electrical storage device 8C can be miniaturized.

In addition, since in a case where part of the cooling member 203G is supposedly damaged, it is only necessary to detach the battery module 202 above the damaged cooling member 203G in the eight battery modules 202 by allocating one cooling member 203G to every battery module 202, the fourth embodiment of the present invention can easily perform the maintenance work such as replacement of the cooling member 203G and so forth.

Incidentally, although the above-mentioned fourth embodiment of the present invention has been described in regard to a case where the sizes in the horizontal direction of the fin plate 203H and the thermal resistance material 214C are set to the sizes comparable to that of the footprint of the battery module 202, for example, the sizes in the horizontal direction of the fin plate 203H and the thermal resistance material 214C may be set smaller than that of the footprint of the battery module 202, not limited to this case.

In addition, although the fourth embodiment of the present invention has been described in regard to a case where the through-hole 221C1 are bored in the bottom part of the lower housing 221C of the housing 220 and the region which is defined by the cooling member 203G, the bottom part of the lower housing 221C and the bottom plate 221C2 is formed as the passage of the coolant, for example, in place of the through-hole 221C1, a groove part where the bottom part of the lower housing 221C and the bottom plate 221C are integrated together may be formed in the bottom part of the lower housing 221C, not limited to this case. Thereby, since there is no need to fabricate the bottom plate 221C2, the number of components of the electrical storage device 8C can be reduced.

Further, although the fourth embodiment of the present invention has been described in regard to a case where the fin plate 203H and the thermal resistance material 214C are made as different members and the fin plate 203H and the thermal resistance material 214C are integrated together with the screw via the sealing material 231, for example, the both may be brought into close constant with each other and formed integrally in advance by transfer molding, not limited to this case. Thereby, since there is no need to prepare the sealing material 231, the cost involved in manufacture of the electrical storage device 8C can be reduced.

In addition, the fourth embodiment of the present invention may appropriately change the direction, the shape, the dimensions and so forth of the fin 203D4 of the cooling member 203G in accordance with a loading position of the battery cell 202 in the electrical storage device 8C. For example, a deviation of a temperature distribution for every battery module 202 can be reduced, for example, by setting a surface area of the fin 203D4 on the downstream side larger than that on the upstream side of the coolant. In addition, for example, the fin 203D4 on a round part of a U-shaped passage may be rounded along the shape of the passage. Thereby, since the pressure loss in the passage of the coolant is reduced, the energy efficiency of the cooling circuit 21 can be heightened. Accordingly, since the smaller pump 23 can be adopted in the cooling circuit 21, the temperature control device 20 can be miniaturized.

Incidentally, the above-mentioned present embodiments have been described in detail in order to describe the present invention comprehensively and are not necessarily limited to the one equipped with all configurations which have been described. In addition, it is possible to replace part of a configuration of one embodiment with a configuration of another embodiment and it is also possible to add a configuration of another embodiment to a configuration of one embodiment.

In addition, although description has been made in regard to a case where the hybrid construction machine according to the present embodiments consists of the hybrid hydraulic excavator, it may be a construction machine such as a hybrid wheel loader and so forth, not limited to this case. Further, although in the present embodiments, description has been made in regard to cases where the liquid-cooled system is used as the cooling system of the electrical storage devices 8, 8A, 8B, 8C, other cooling systems may be used not limited to this case.

In addition, although the present embodiments have been described in regard to cases where as the names of the members which configure the housings 220, 220A, 220B, 220C, the lower housing, the intermediate housing and the upper housing are used, these names are used expediently in order to show a positional relation of the respective members and function-based differentiation is not made by them and therefore the names of the lower housing, the intermediate housing and the upper housing may be replaced with one another appropriately and the number of the housings 220, 220A, 220B, 220C and the kind thereof are not limited to those in the above-mentioned cases.

REFERENCE SIGNS LIST 1 engine (prime mover)
2 assisting electricity generation motor (motor generator)
8, 8A, 8B, 8C electrical storage device
20 temperature control device
21 cooling circuit
22 liquid piping
23 pump
26 radiator
27 fan
110 revolving superstructure
112 prime mover compartment
112A frame
200 battery cell
202 battery module
203, 203E, 203F cooling plate (heat exchange member)
203A, 203A1, 203A2 upper surface body
203B, 203B1, 203B2 lower surface body
203C, 203C1, 203C2 groove part
203D, 203D1, 203D2, 203D3, 203D4 fin
203G cooling member (heat exchange member)
203H fin plate
203J base
204, 204A thermal conducting sheet
214, 214A projection (thermal resistor)
214B, 214C thermal resistance material (thermal resistor)
214C1 opening
220, 220A, 220B, 220C housing
221, 221A, 221B, 221C lower housing
221C1 through-hole
221C2 bottom plate
222, 222A, 222C intermediate housing
222a intermediate plate
222b intermediate volume body
223, 223A, 223B, 223C upper housing
231, 232 sealing material

The invention claimed is:

1. A hybrid construction machine, comprising:
a prime mover;
a motor generator which provides power for the prime mover and generates electricity; and
an electrical storage device which transfers electric power with the motor generator,
wherein the electrical storage device includes:
a plurality of battery cells,
a housing which covers the plurality of battery cells leaving the battery cells at least partially separated from one another,
a cooling plate attached to the housing in which a passage for a heating medium is disposed to perform heat exchange with the plurality of battery cells, and
a plurality of projections, which are interposed between the housing and the cooling plate, one end of each of the plurality of projections is in contact with the cooling plate and another end of each of the plurality of projections is in contact with the housing so as to hinder transfer of heat between the housing and the cooling plate,
wherein each of the plurality of projections are made of a resin material having a thermal conductivity which is less than at least one of a thermal conductivity of the housing and a thermal conductivity of the cooling plate, and
wherein a gap is formed between the housing and the cooling plate by the plurality of projections.

2. The hybrid construction machine according to claim 1, wherein
at least one of the housing and the cooling plate is made of a metal material.

3. The hybrid construction machine according to claim 1, wherein
the housing has a volume body which is opened downward and is fixed to the cooling plate from above the plurality of battery cells through an opening in the volume body in a state of leaving the plurality of battery cells arranged above the cooling plate.

4. The hybrid construction machine according to claim 1, wherein
the housing consists of a metal casting.

5. The hybrid construction machine according to claim 1, further comprising:
a prime mover compartment which contains the prime mover; and
a radiator which is arranged in the prime mover compartment and cools the heating medium,
wherein the prime mover compartment has a suction port which is disposed in a frame and through which outdoor air which is sent to the radiator is taken in, and
wherein the electrical storage device is disposed between the frame of the prime mover compartment and the radiator.

* * * * *